(12) United States Patent
Rimmer

(10) Patent No.: US 12,421,997 B2
(45) Date of Patent: Sep. 23, 2025

(54) RETAINING PLATE SYSTEM FOR ESP MOTOR RADIAL BEARING ANTI-ROTATION TAB RETENTION

(71) Applicant: Halliburton Energy Services, Inc., Houston, TX (US)

(72) Inventor: Michael Rimmer, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 18/203,900

(22) Filed: May 31, 2023

(65) Prior Publication Data

US 2024/0401447 A1 Dec. 5, 2024

(51) Int. Cl.
| | |
|---|---|
| E21B 43/12 | (2006.01) |
| F04D 13/10 | (2006.01) |
| F16C 17/02 | (2006.01) |
| F16C 27/02 | (2006.01) |
| F16C 35/02 | (2006.01) |

(52) U.S. Cl.
CPC ............ *F16C 17/02* (2013.01); *E21B 43/128* (2013.01); *F04D 13/10* (2013.01); *F16C 27/02* (2013.01); *F16C 35/02* (2013.01); *F16C 2226/72* (2013.01)

(58) Field of Classification Search
CPC .......... F16C 17/02; F16C 17/12; F16C 27/02; F16C 35/02; F16C 2226/72; F16C 2226/74; F16C 2352/00; F16C 2380/26; F04D 13/10; F04D 29/046; F04D 29/0465; H02K 5/132; H02K 5/167; E21B 43/128
See application file for complete search history.

(56) References Cited

U.S. PATENT DOCUMENTS

| | | | |
|---|---|---|---|
| 6,241,616 B1 | 6/2001 | Lightcap | |
| 7,836,947 B2 | 11/2010 | Booth | |
| 8,910,718 B2 | 12/2014 | Watson et al. | |
| 9,951,810 B2 | 4/2018 | Parmeter et al. | |
| 2024/0392830 A1* | 11/2024 | Bencze | ............... F04D 29/0465 |

FOREIGN PATENT DOCUMENTS

| | | | |
|---|---|---|---|
| DE | 102018111187 A1 | * | 11/2019 |
| WO | 2022212660 A1 | | 10/2022 |

OTHER PUBLICATIONS

Machine Translation of DE-102018111187-A1 (Year: 2019).*
Foreign Communication from Related Application—International Search Report and Written Opinion of the International Searching Authority, International Application No. PCT/US2023/023975, dated Feb. 22, 2024, 12 pages.

* cited by examiner

*Primary Examiner* — Alan B Waits
(74) *Attorney, Agent, or Firm* — Conley Rose, P.C.; Rodney B. Carroll

(57) ABSTRACT

Rotor bearings for ESP motors can include anti-rotation tabs configured to engage, for example between a bearing bushing and a stator of the ESP motor. For example, prior to insertion of the rotor bearing within the stator, the anti-rotation tabs may be held in place within axial slots in the outer surface of a bearing bushing using one or more retaining plates. The retaining plates and the bearing bushing may be configured to allow for axial insertion of the retaining plates onto the bearing bushing and then rotation of the retaining plate with respect to the bearing bushing to retain the anti-rotation tab on the bearing bushing. Such systems and methods may be particularly useful for ceramic bearing bushings.

20 Claims, 15 Drawing Sheets

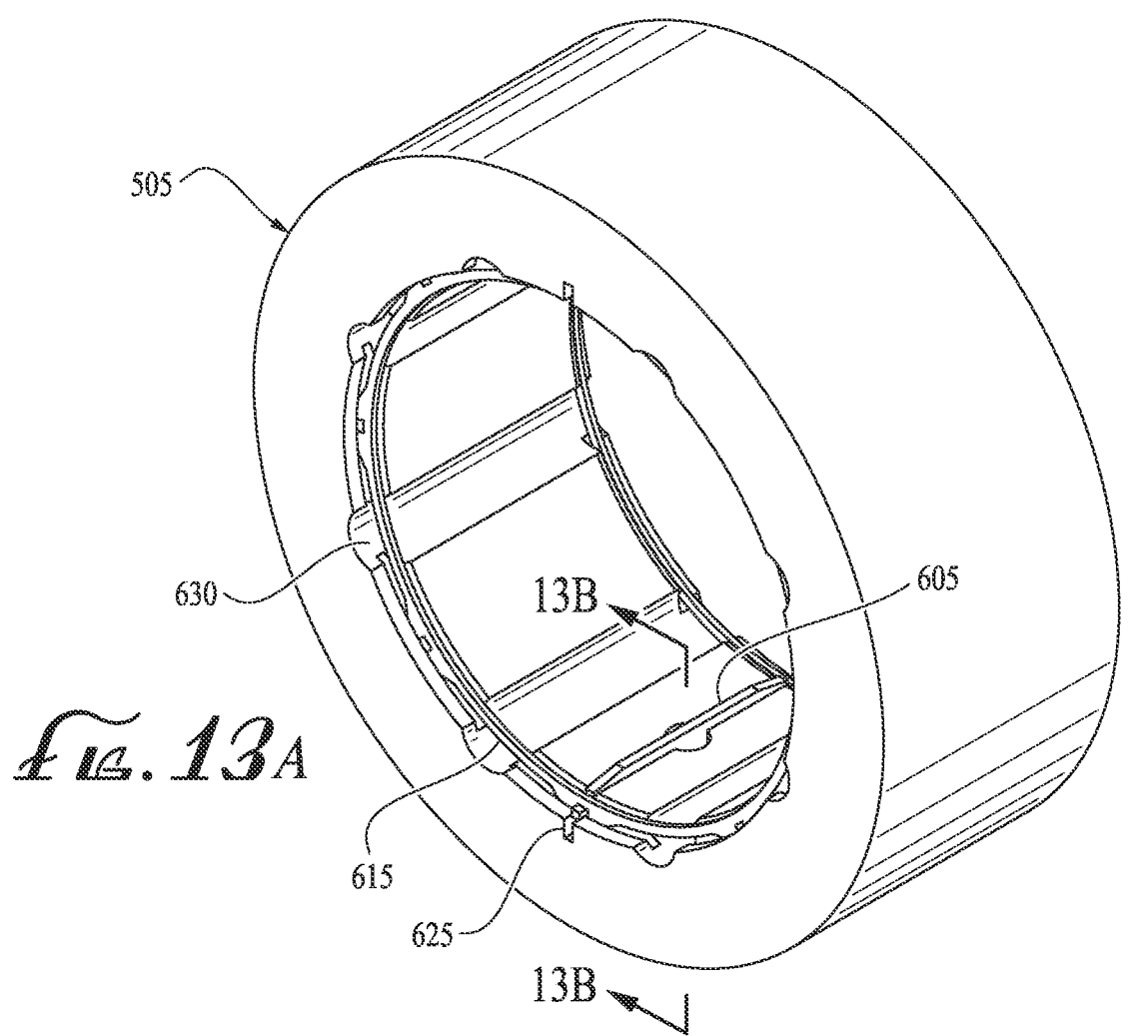
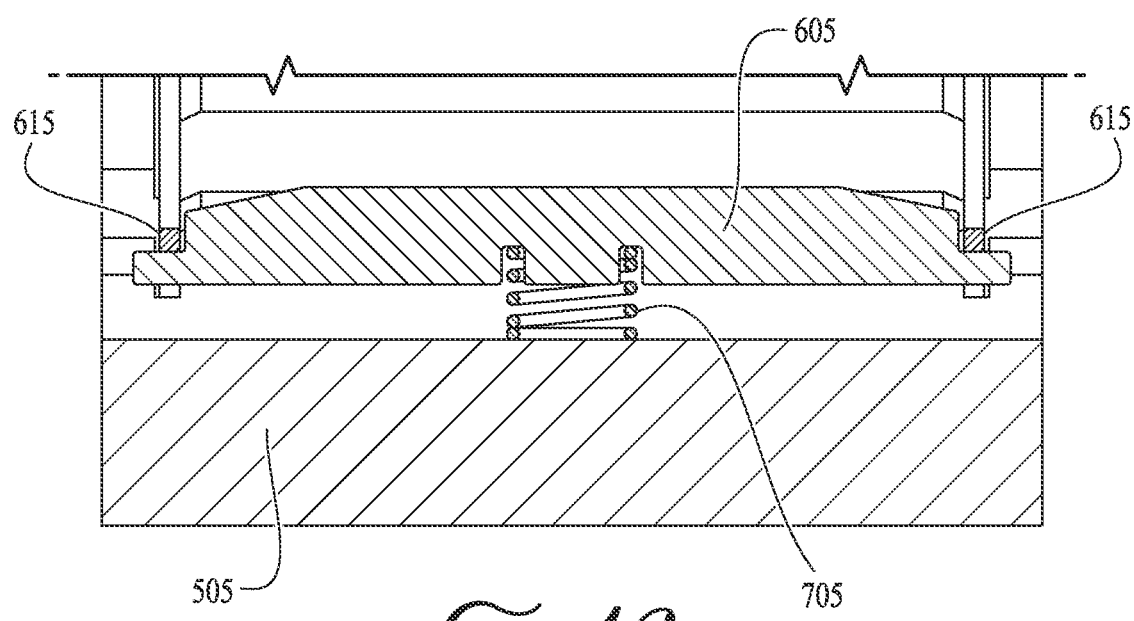

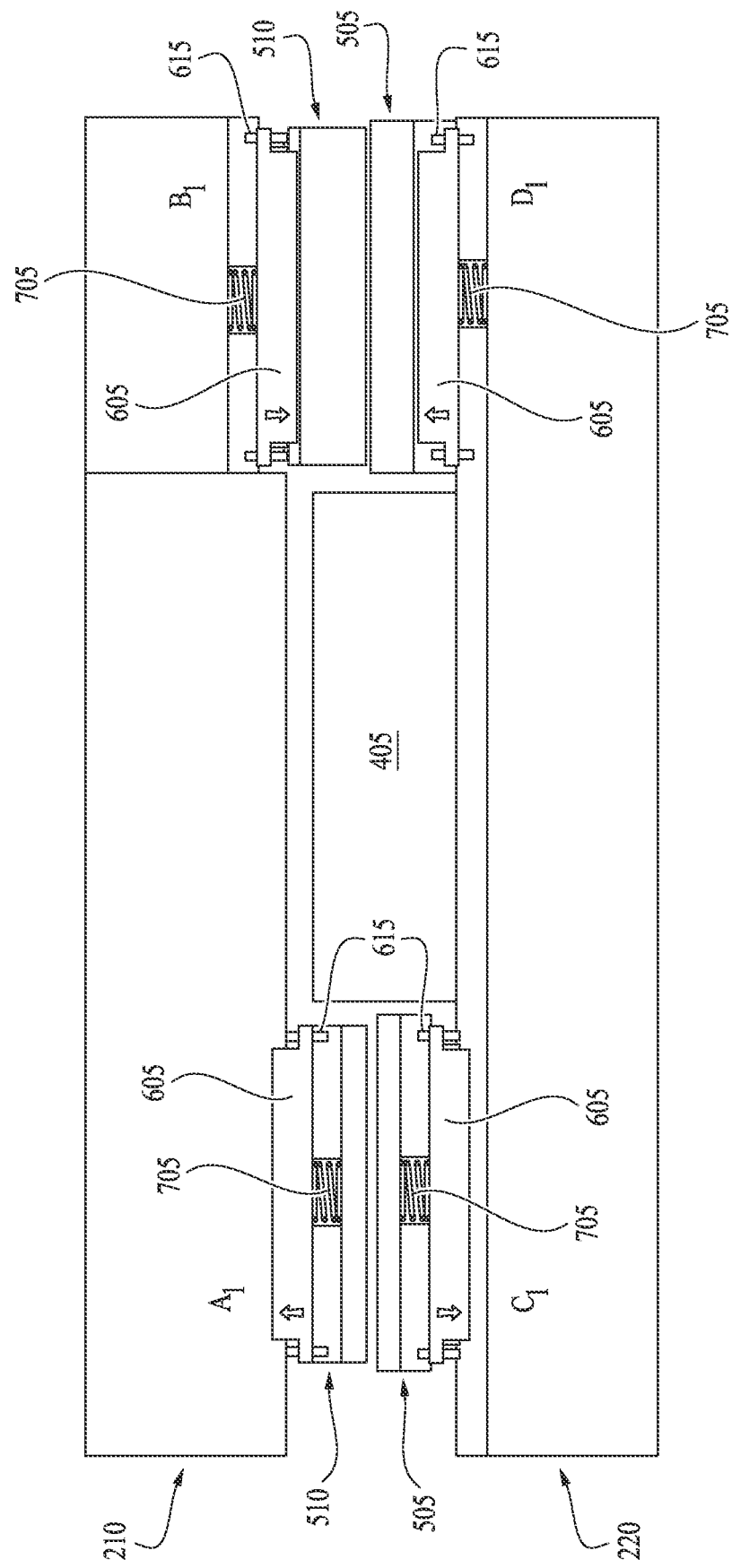

RETAINING PLATE SYSTEM FOR ESP MOTOR RADIAL BEARING ANTI-ROTATION TAB RETENTION

CROSS-REFERENCE TO RELATED APPLICATIONS

None.

STATEMENT REGARDING FEDERALLY SPONSORED RESEARCH OR DEVELOPMENT

Not applicable.

FIELD

This disclosure relates generally to the field of pumping. More particularly, this disclosure relates to the field of electric submersible pumps for use downhole in a well. Still more particularly, this disclosure relates to downhole motors of the sort which may be used in electric submersible pumps, and to rotor bearing improvements for such downhole motors.

BACKGROUND

Electric submersible pump (ESP) assemblies are used to artificially lift fluid to the surface, for example in deep wells such as oil or water wells. ESP assemblies are commonly used in the oil and gas industry to extract fluids from underground reservoirs. By way of example, the artificial lift provided by ESP assemblies may be useful in situations when the reservoir does not have sufficient energy to allow the well to naturally produce effectively, or when an additional boost to production of the well is desired. Improvements to ESP assemblies can improve overall production of fluids from a well, which may thereby improve the profitability of the well. Improvements in the construction and assembly of the ESP and/or its component parts may result in lower ESP costs and/or in improved characteristics (such as durability or life).

A typical ESP assembly comprises, from bottom to top, an electric motor, a seal unit, a pump intake, and a pump (e.g. typically a centrifugal pump), which are all mechanically connected together with shafts and shaft couplings. The electric motor supplies torque to the shafts, which provides power to the centrifugal pump. The electric motor is isolated from a wellbore environment by a housing and by the seal unit. The seal unit can act as an oil reservoir for the electric motor. The oil can function both as a dielectric fluid and as a lubricant in the electric motor. The seal unit also may provide pressure equalization between the electric motor and the wellbore environment.

The centrifugal pump is configured to transform mechanical torque received from the electric motor via a drive shaft to fluid pressure which can lift fluid up the wellbore. For example, the centrifugal pump typically has rotatable impellers within stationary diffusers. A shaft extending through the centrifugal pump is operatively coupled to the motor, and the impellers of the centrifugal pump are rotationally coupled to the shaft. In use, the motor can rotate the shaft, which in turn can rotate the impellers of the centrifugal pump relative to and within the stationary diffusers, thereby imparting pressure to the fluid within the centrifugal pump. The electric motor is generally connected to a power source located at the surface of the well using a cable and a motor lead extension. The ESP assembly is placed into the well and usually is inside a well casing. In a cased completion, the well casing separates the ESP assembly from the surrounding formation. In operation, perforations in the well casing allow well fluid to enter the well casing and flow to the pump intake for transport to the surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 13A is an isometric view of yet another alternate embodiment illustrating a journal bearing assembly, in which an anti-rotation tab is configured to secure the inner journal bearing of the rotor bearing assembly onto the drive shaft, with the retaining plate configured to hold the anti-rotation tab within a tab axial slot on the inner surface of the journal bearing, according to an embodiment of the disclosure;

FIG. 13B is a partial cross-sectional view of the journal bearing assembly of FIG. 13A, according to an embodiment of the disclosure; and FIG. 14 is a schematic axial cross-sectional view of a portion of an ESP motor illustrating various alternate embodiments of ways in which two cylindrical components of the ESP motor can be rotationally fixed via engagement by anti-rotation tabs, according to embodiments of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Disclosed embodiments relate generally to improved techniques for forming/assembling rotor bearing assemblies. More specifically, for rotor bearing assemblies which are engaged within the stator by one or more anti-rotation tab, one or more retaining rings can be used to retain the anti-rotation tab in place on the exterior of the rotor bearing assembly. Disclosed embodiments illustrate improved techniques for providing the one or more retaining rings on the rotor bearing assembly and/or for the one or more retaining rings to interact effectively with the anti-rotation tab during installation of the rotor bearing within the stator. Such improved rotor bearing designs may be particularly useful for rotor bearings having ceramic materials and/or for rotor bearings for use in permanent magnet motor (PMM) designs.

Figure 1:
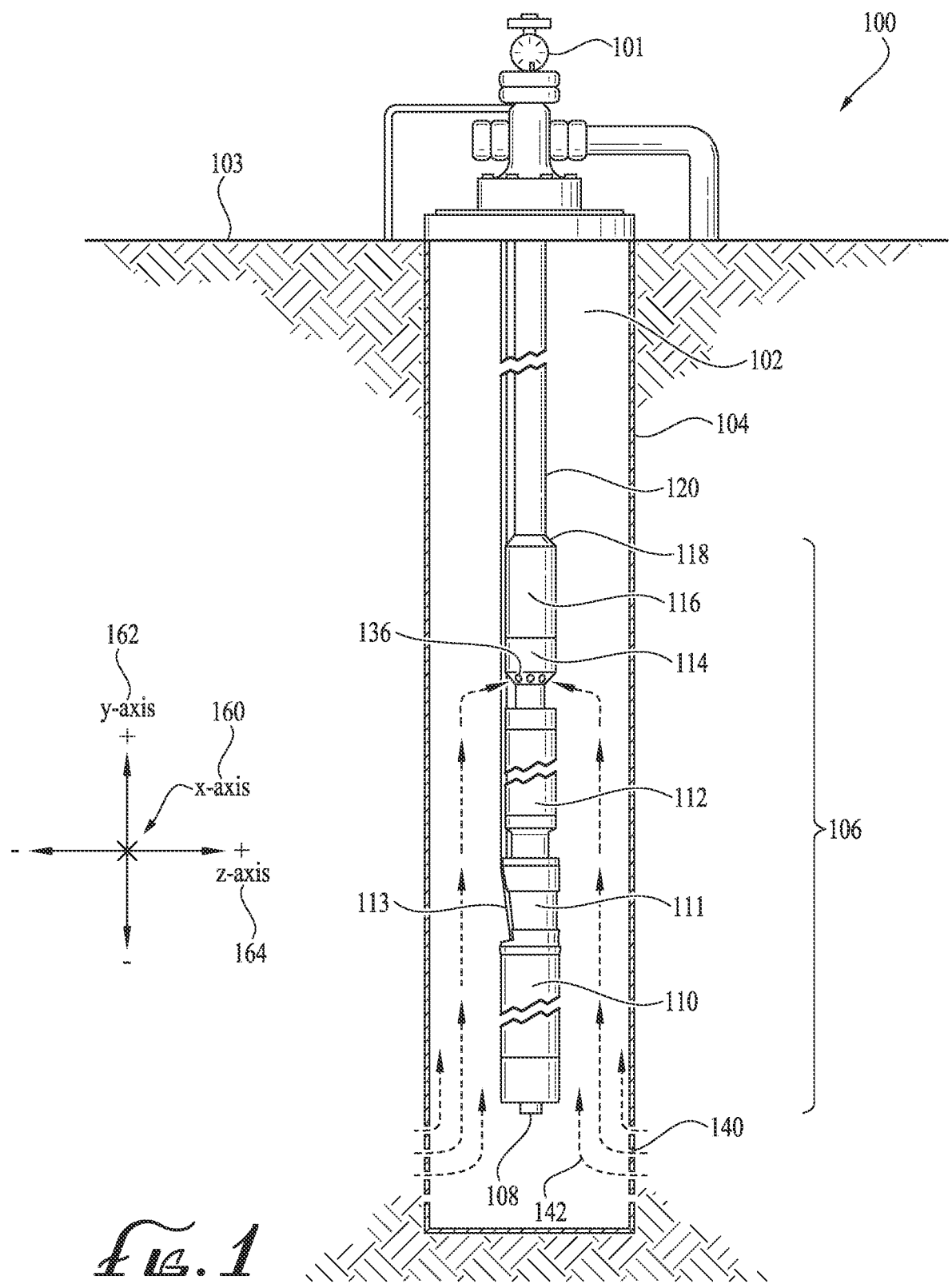
FIG. 1 is a schematic illustration of an exemplary electric submersible pump (ESP) assembly disposed in a wellbore, according to an embodiment of the disclosure.

Turning now to FIG. 1, an exemplary producing well environment 100 is described. In an embodiment, the environment 100 comprises a wellhead 101 above a wellbore 102 located at the surface 103. A casing 104 is provided within the wellbore 102. For convenience of reference, FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. In the embodiment of FIG. 1, the Y-axis 162 is approximately parallel to a central axis of a vertical portion of the wellbore 102.

An exemplary electric submersible pump (ESP) assembly 106 is deployed downhole in a well within the casing 104 and comprises an optional sensor unit 108, an electric motor 110, a motor head 111, a seal unit 112, an electric power cable 113, a pump intake 114, a centrifugal pump 116, and a pump outlet 118 that couples the centrifugal pump 116 to a production tubing 120. The centrifugal pump 116 is operatively coupled to the motor 110 by a shaft (not shown). In an embodiment, the ESP assembly 106 may employ thrust bearings in several places, for example in the electric motor 110, in the seal unit 112, and/or in the centrifugal pump 116. While not shown in FIG. 1, in an embodiment, the ESP assembly 106 can comprise a gas separator that may employ one or more thrust bearings. The motor head 111 couples the electric motor 110 to the seal unit 112. The electric power cable 113 may connect to a source of electric power at the surface 103 and to the electric motor 110, for example being configured to provide power from the source of electric power at the surface 103 to the electric motor 110.

In operation, the casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (such as a rod pump, a progressive cavity pump, any other type of pump suitable for the system, or combinations thereof) may be used instead.

Figure 2:
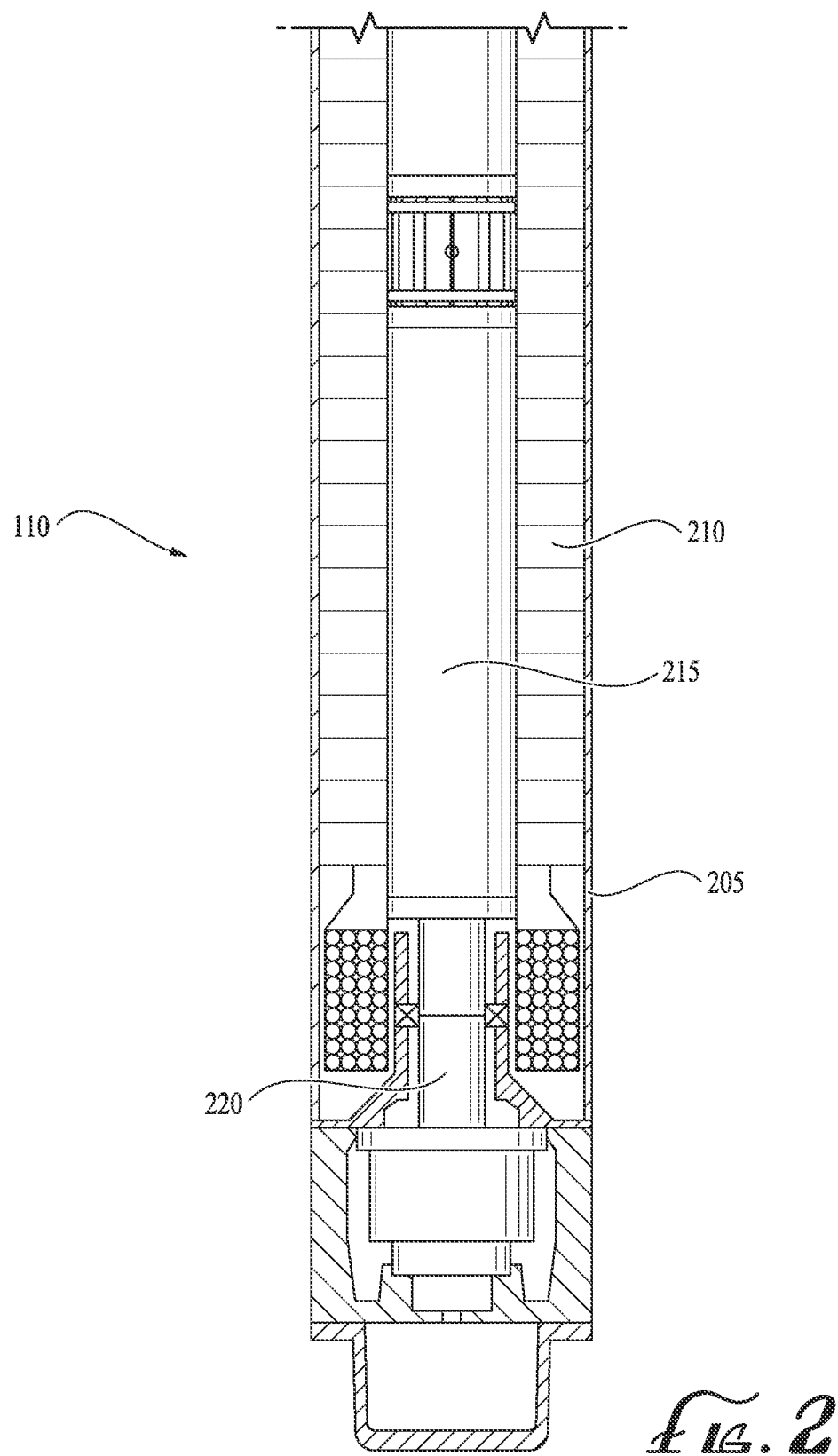
FIG. 2 is a cross-sectional view of an exemplary motor for the electric submersible pump assembly of FIG. 1, according to an embodiment.
Figure 3:
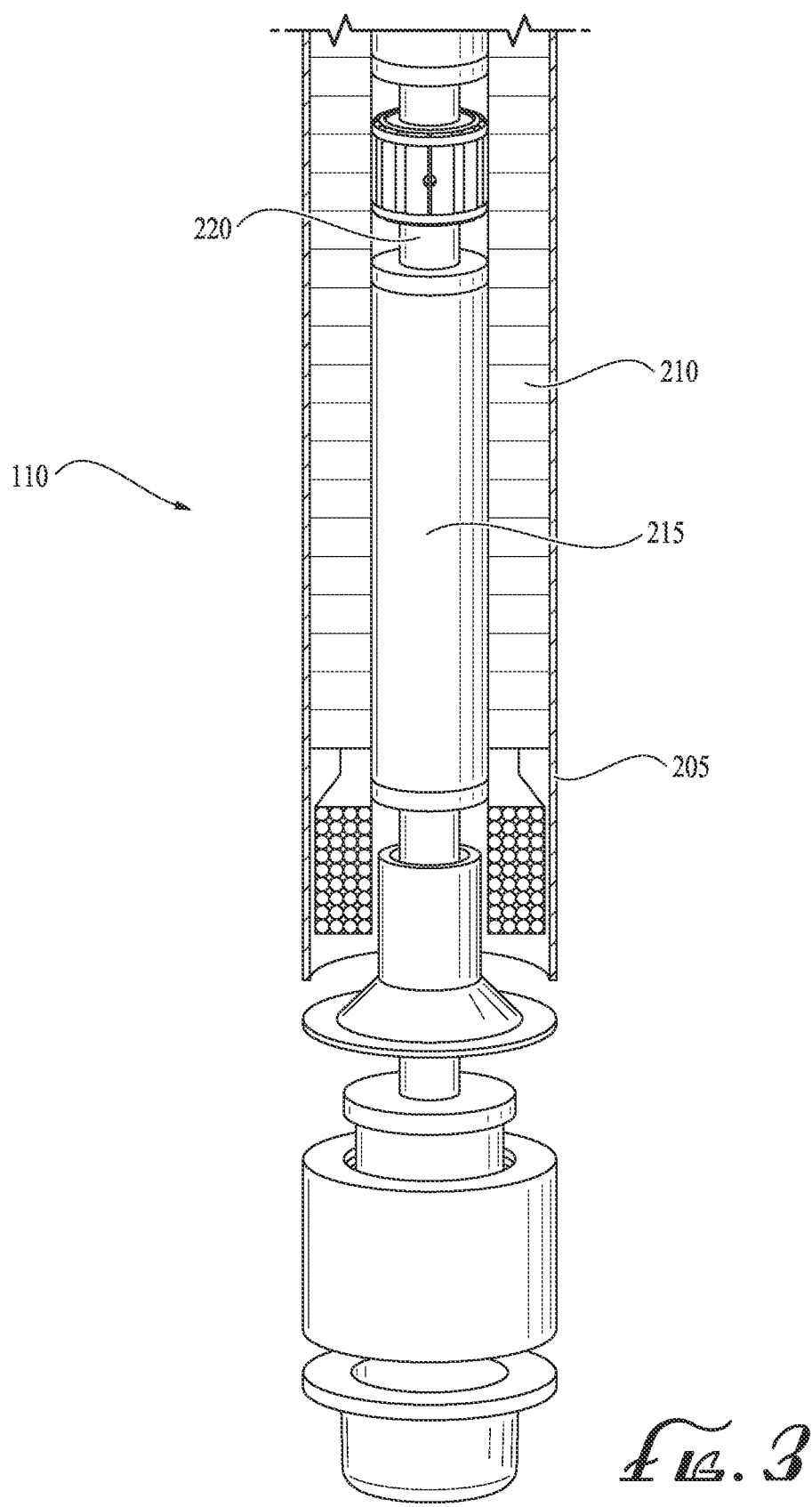
FIG. 3 is an exploded isometric view of the motor of FIG. 2, according to an embodiment of the disclosure.

As shown in FIGS. 2-3, an exemplary motor 110 of the ESP assembly includes a housing 205, a stator 210, a rotor 215, and a drive shaft 220. The housing 205 typically comprises a hollow cylinder or tube and is configured to protect the internal components of the motor 110 from the external environment. The stator 210 also typically comprises a hollow cylinder and is secured to the housing 205 (e.g. to the inner surface of the housing 205) so as to be stationary within the housing 205. Typically, the stator 210 comprises a plurality of laminations, which may be thin sheets of steel, stainless steel, iron, or bronze, wrapped by a plurality of electrically conductive windings. When energized, the windings generate a rotating magnetic field for interaction with the rotor 215 to induce rotation of the rotor 215. The rotor 215 also typically comprises a hollow cylinder and is concentrically arranged between the stator 210 and the drive shaft 220, for example with the drive shaft 220 typically extending longitudinally along the centerline of the motor 110, the rotor 215 disposed around the drive shaft 220, and the stator 210 disposed around the rotor 215, within the housing 205. The rotor 215 is rotatable within the stator 210 and secured to the drive shaft 220, such that rotation of the rotor 215 drives the drive shaft 220. In embodiments, the motor 110 may be a two or more pole motor, a three-phase squirrel cage induction motor, a permanent magnet motor (PMM), a hybrid PMM, or other motor configuration.

Figure 4:
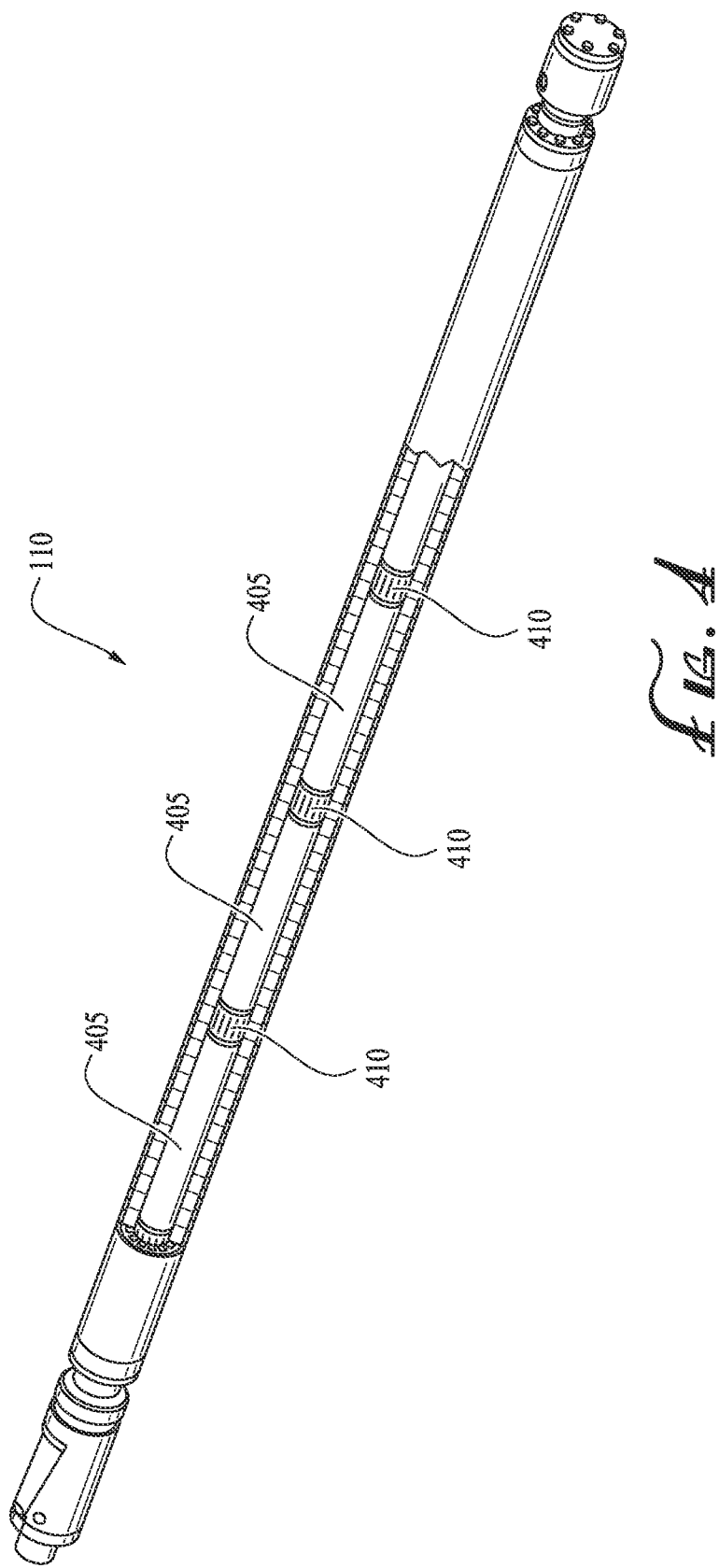
FIG. 4 is a partial cut-away isometric view of an exemplary ESP motor having a plurality of rotor modules with rotor bearing assemblies therebetween, according to an embodiment of the disclosure.

Depending on the power requirements of the motor 110, the rotor 215 typically includes a number of rotor modules, which together jointly form the rotor 215, with each rotor module secured to the drive shaft 220. The rotational magnetic field of the stator 210 when energized can induce rotation of the rotor 215, and thereby the drive shaft 220, with the drive shaft 220 transmitting rotational torque from the motor 110 to the pump 116. As shown in FIG. 4, the rotor modules 405 (jointly forming the rotor 215) are spaced apart from each other along the drive shaft 220, with a rotor bearing assembly 410 typically located between adjacent rotor modules 405. Rotor bearing assemblies 410 can also be located at the top of the uppermost rotor module 405 and/or the bottom of the lowermost rotor module 405 (e.g. at the top and bottom of the rotor). In some embodiments, the rotor bearing assembly 410 can be a hydrodynamic bearing assembly.

Figure 5:
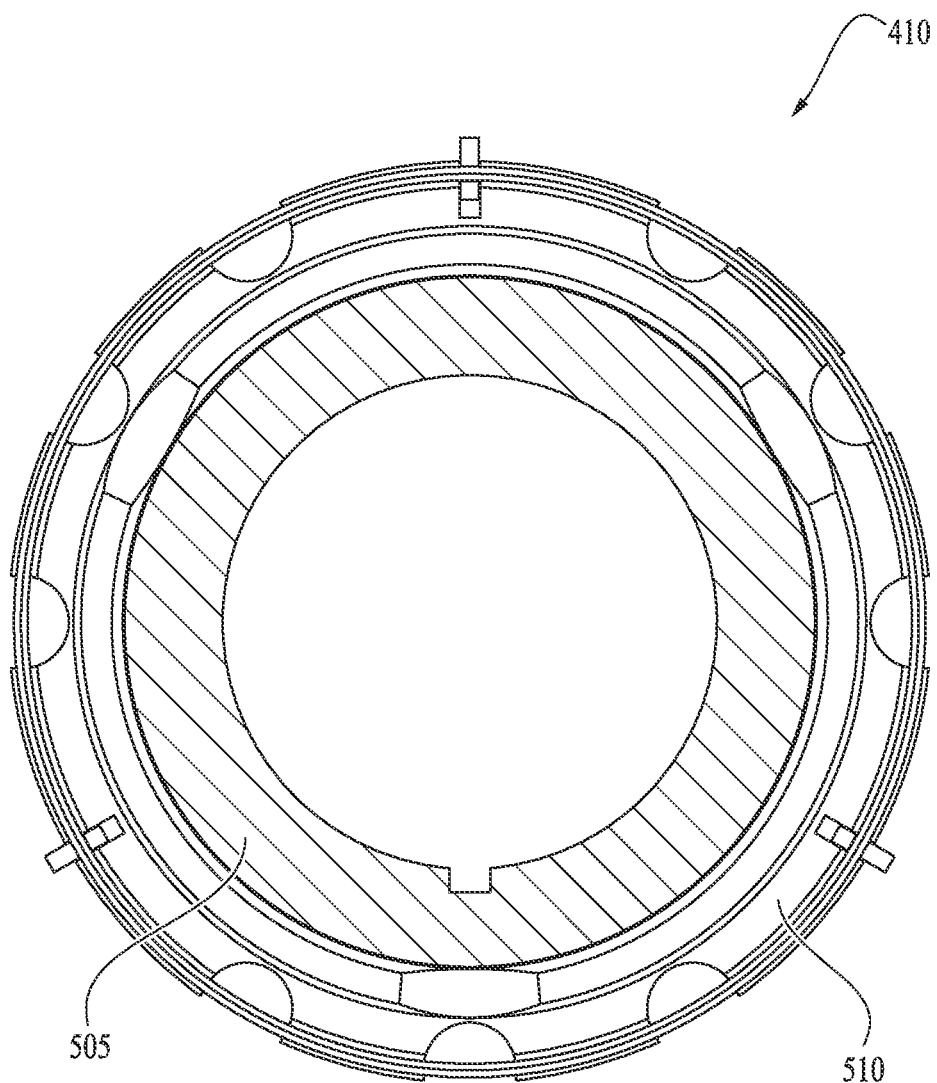
FIG. 5 is a radial cross-sectional view of an exemplary rotor bearing assembly, according to an embodiment of the disclosure.

Each rotor bearing assembly 410 is configured to support the rotor 215 at predefined axial positions to maintain correct radial alignment of the drive shaft 220 during motor operation. As shown in FIG. 5, exemplary rotor bearing assemblies 410 comprise a journal sleeve 505 and a bearing bushing assembly 510. The journal sleeve 505 is secured to the drive shaft 220 and rotates with the drive shaft 220. In embodiments, the inner journal sleeves 505 can be configured to space each rotor module 405 evenly on the drive shaft 220. The outer bearing bushing assembly 510 is concentrically located around the inner journal sleeve 505, and the bearing bushing assembly 510 fixedly engages into the stator lamination (e.g. the bearing bushing assembly is configured to engage the inner surface of the stator 210 to prevent rotation therein). The engagement into the stator lamination is required to ensure that the bearing bushing assembly 510 does not spin during operation, but instead provides a stationary surface within which the inner journal sleeve 505 can rotate, to produce the hydrodynamic lubricating film needed to support the rotor radial load.

Figure 6:
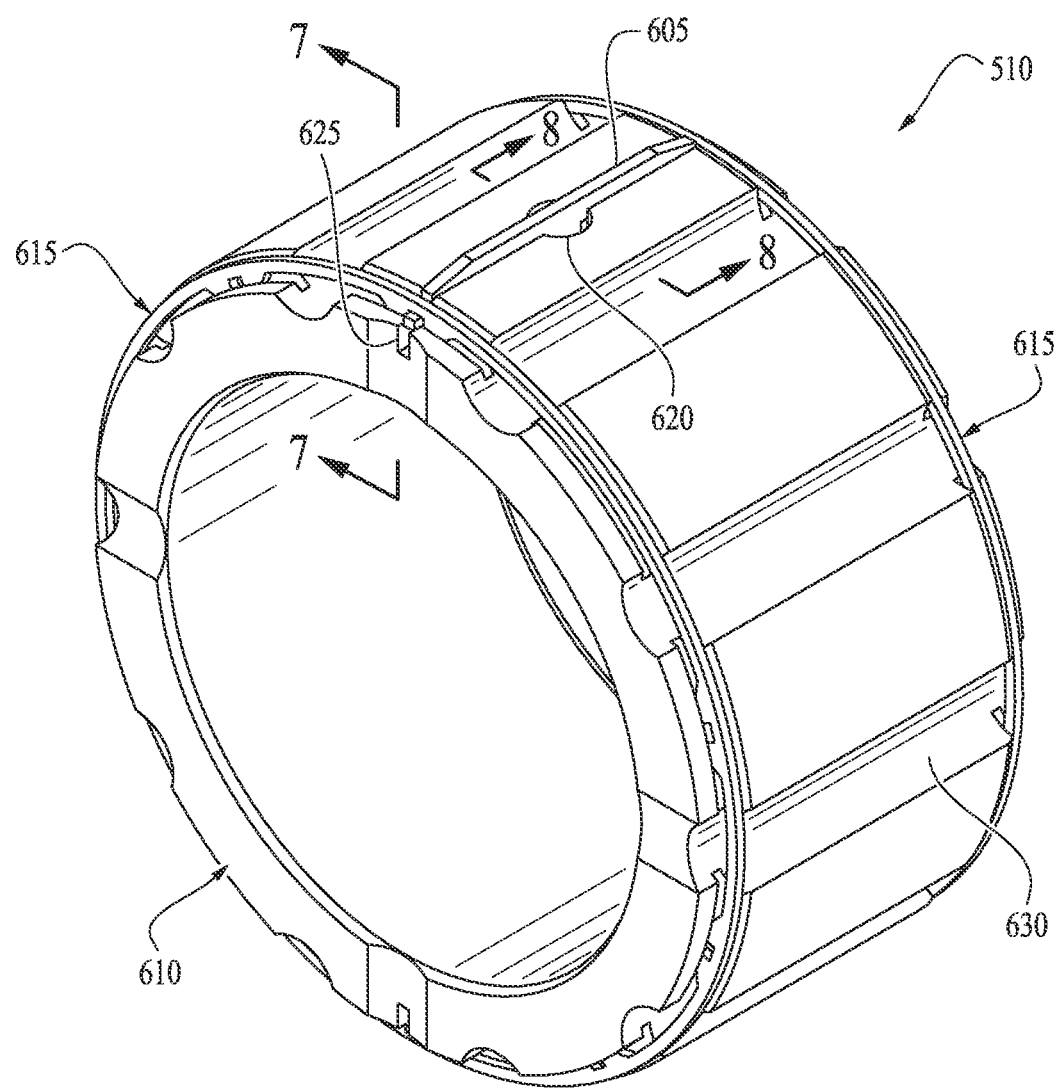
FIG. 6 is an isometric view of an exemplary bearing bushing assembly, according to an embodiment of the disclosure.

One exemplary technique for the bearing bushing assembly 510 to engage the stator 210 (e.g. in a way that prevents rotation of the bearing bushing assembly 510 within the stator 210) uses one or more spring-loaded anti-rotation tab 605. For example, as shown in FIG. 6, the bearing bushing assembly 510 can include a spring-loaded anti-rotation tab 605 which is biased radially outward from the outer surface of the bearing bushing 610 (e.g. to extend radially outward from the outer surface of the bearing bushing 610 unless sufficient radially inward force is applied to the spring-loaded ant-rotation tab 605). The spring-loaded anti-rotation tab 605 may be configured to correspond to a slot in the inner surface of the stator 210 for engagement.

To insert the rotor bearing assembly 410 in place within the stator 210, the spring-loaded anti-rotation tab 605 is compressed, for example so that the exterior of the spring-loaded tab 605 is approximately flush with the outer surface of the rotor bearing assembly 410 (e.g. the outer surface of the bearing bushing 610). The rotor bearing assembly 410 can then be inserted into the open bore of the stator 210. Then, by rotating the rotor bearing assembly 410 within the stator 210, the spring-loaded anti-rotation tab 605 can automatically engage the corresponding slot in the inner surface of the stator 210 when, during rotation, the spring-loaded tab 605 aligns with the slot. This approach allows assembly (e.g. insertion of the rotor bearing assembly 410 within the stator 210) without the need to pre-align the spring-loaded tab 610 with a corresponding slot in the inner surface of the stator 210.

For convenience, a retention device (e.g. such as a retaining plate 615, as discussed herein) may be used to hold the spring-loaded anti-rotation tab(s) 605 in place on the bearing bushing 610 before installation of the rotor bearing assembly 410 within the stator 210 (e.g. to prevent the spring-loaded tab(s) 605 from separating from the bearing bushing 610). This disclosure provides improved rotor bearing assembly designs and methods. Particularly, improved techniques for retaining the spring-loaded anti-rotation tab(s) 605 in place on the bearing bushing 610 during assembly/installation are disclosed. These improved techniques may be especially useful for bearings formed of hard materials, such as ceramics. For example, by eliminating the need to apply force to fold or bend any portion of the retention device while it is located on a ceramic bearing bushing 610, the chances of damage to the ceramic material of the rotor bearing assembly can be minimized, thereby reducing the rate of rejection during formation of ceramic rotor bearings. Also, use of a retaining plate without open gaps in its circumference can more securely hold the anti-rotation tab 605 in place, since there are no gaps that the anti-rotation tab 605 could inadvertently slide through. Further, the improved methods of assembly can simplify the installation process.

Figure 7:
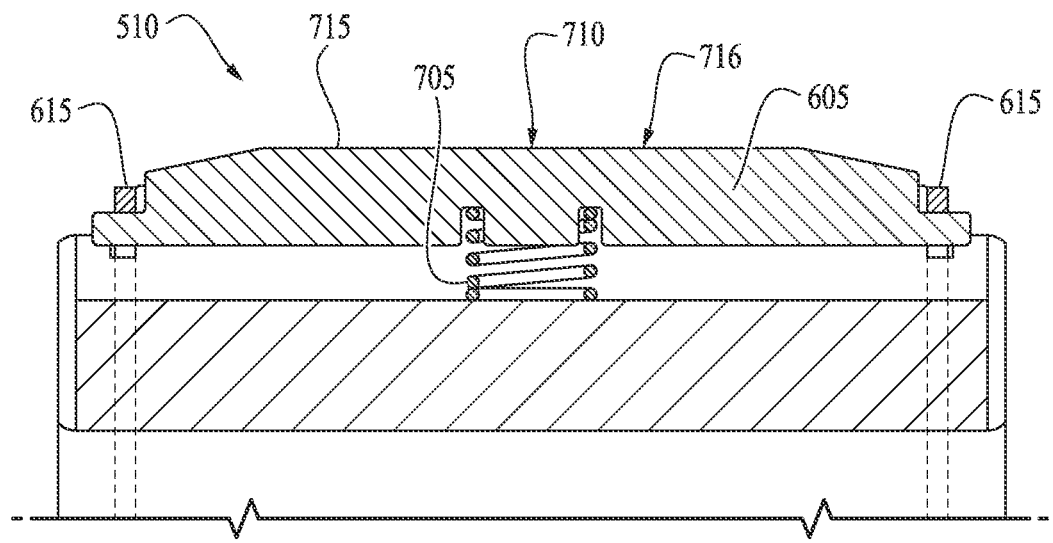
FIG. 7 is a partial axial cross-sectional view of the bearing bushing assembly of FIG. 6, according to an embodiment of the disclosure.

An exemplary rotor bearing bushing assembly 510, of the sort which might be used in an ESP motor for use downhole in a well as part of an ESP, is shown in FIGS. 6-7. The rotor bearing bushing assembly 510 can comprise a bearing bushing 610, one or more anti-rotation tab 605, one or more biasing element 705, and one or two retaining plates 615. Although FIGS. 6-7 illustrates an exemplary embodiment having a plurality of anti-rotation tabs 605, with a corresponding plurality of biasing elements 705, the disclosure is not so limited. The bearing bushing 610 comprises one or more spring recess 620 extending inward from an outer surface of the bearing bushing 610, one or more tab axial slot 625 on the outer surface of the bearing bushing 610 (e.g. extending axially, such as approximately parallel to the longitudinal axis of the bearing bushing 610), and one or more retaining grooves 905 extending circumferentially on the outer surface of the bearing bushing 610. Typically, each retaining groove 905 may be disposed in proximity to an axial end of the bearing bushing 610. Each tab axial slot 625 intersects the corresponding spring recess 620 and retaining groove 905. In embodiments, the bearing bushing 610 is substantially cylindrical (e.g. a hollow cylinder) about a longitudinal axis.

Each anti-rotation tab 605 is configured to fit and extend axially in the corresponding axial slot 625. The anti-rotation tab 605 is configured to be radially slidable within the corresponding axial slot 625. In some embodiments, the anti-rotation tab 605 can extend substantially the entire length of the tab axial slot 625. In some embodiments, each tab axial slot 625 can extend substantially the entire axial length of the bearing bushing 610. Each biasing element 705 (e.g. compression spring) is configured to fit in the corresponding spring recess 620 and to push radially outward on the corresponding anti-rotation tab 605 in the axial slot 625 (e.g. the spring is located beneath/inward of the corresponding anti-rotation tab 605).

Figure 8:
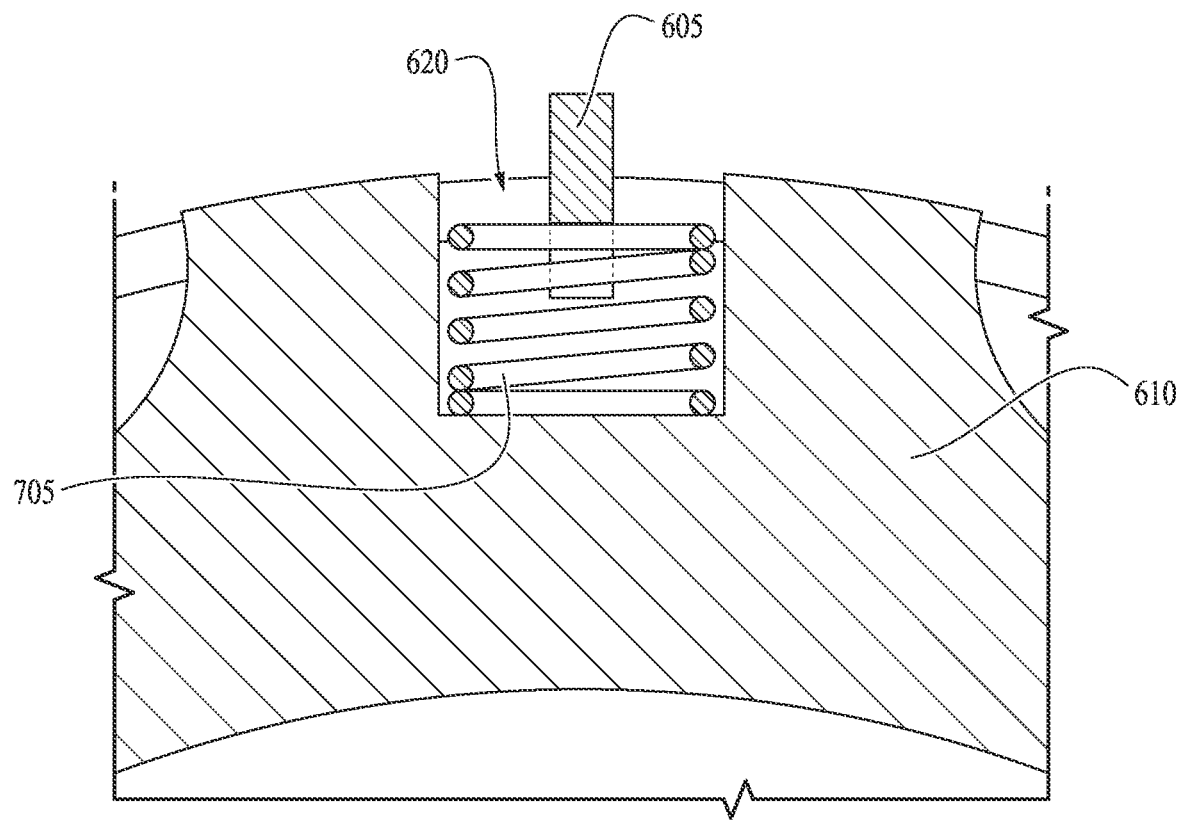
FIG. 8 is a partial radial cross-sectional view of the bearing bushing assembly of FIG. 6, according to an embodiment of the disclosure.
Figure 9A:
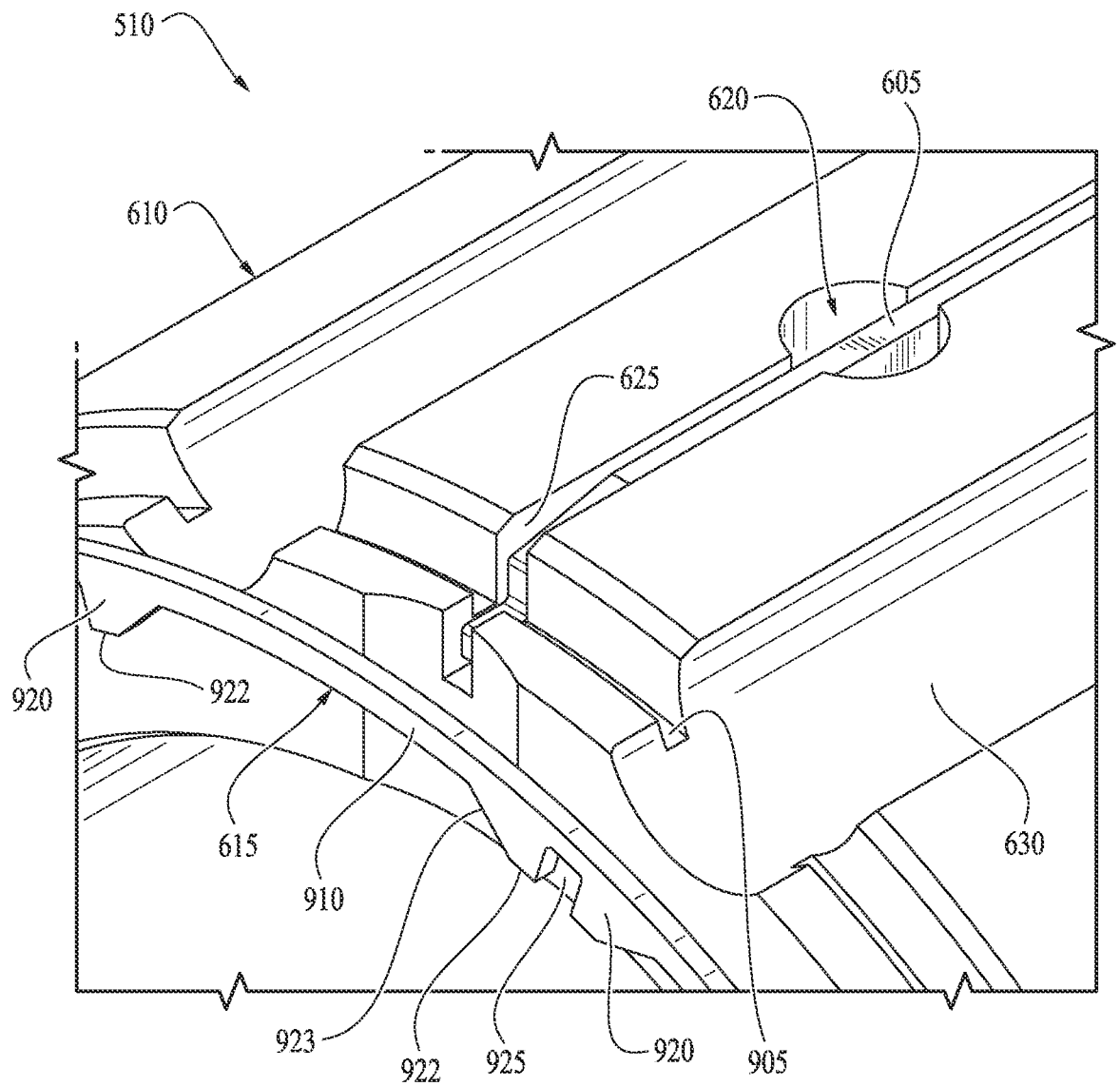
FIGS. 9A-9D are partial isometric views of the bearing bushing assembly illustrating a method of assembling the retaining plate onto the bearing bushing, according to an embodiment of the disclosure.
Figure 9B:
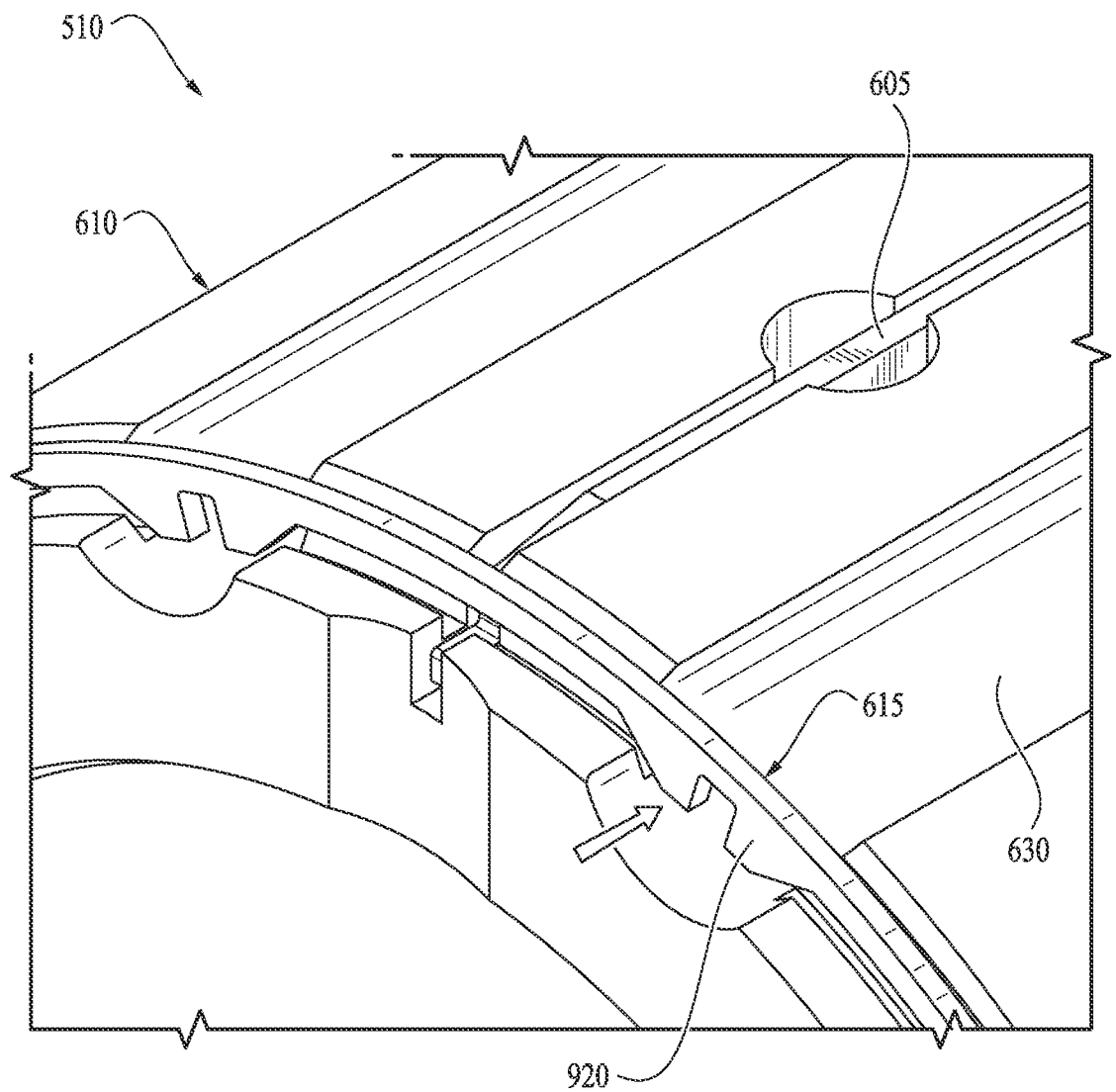
Figure 9C:
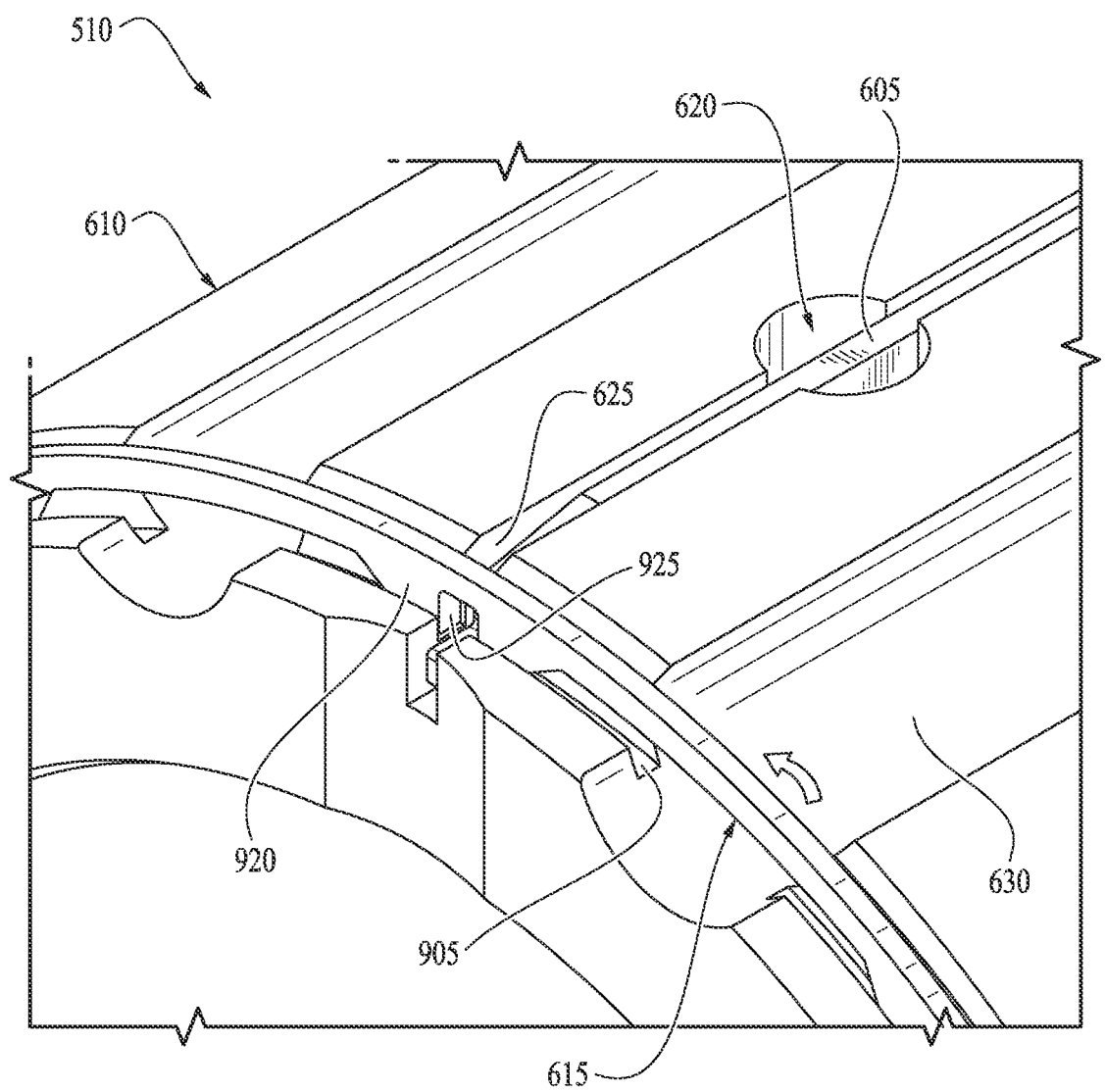
Figure 9D:
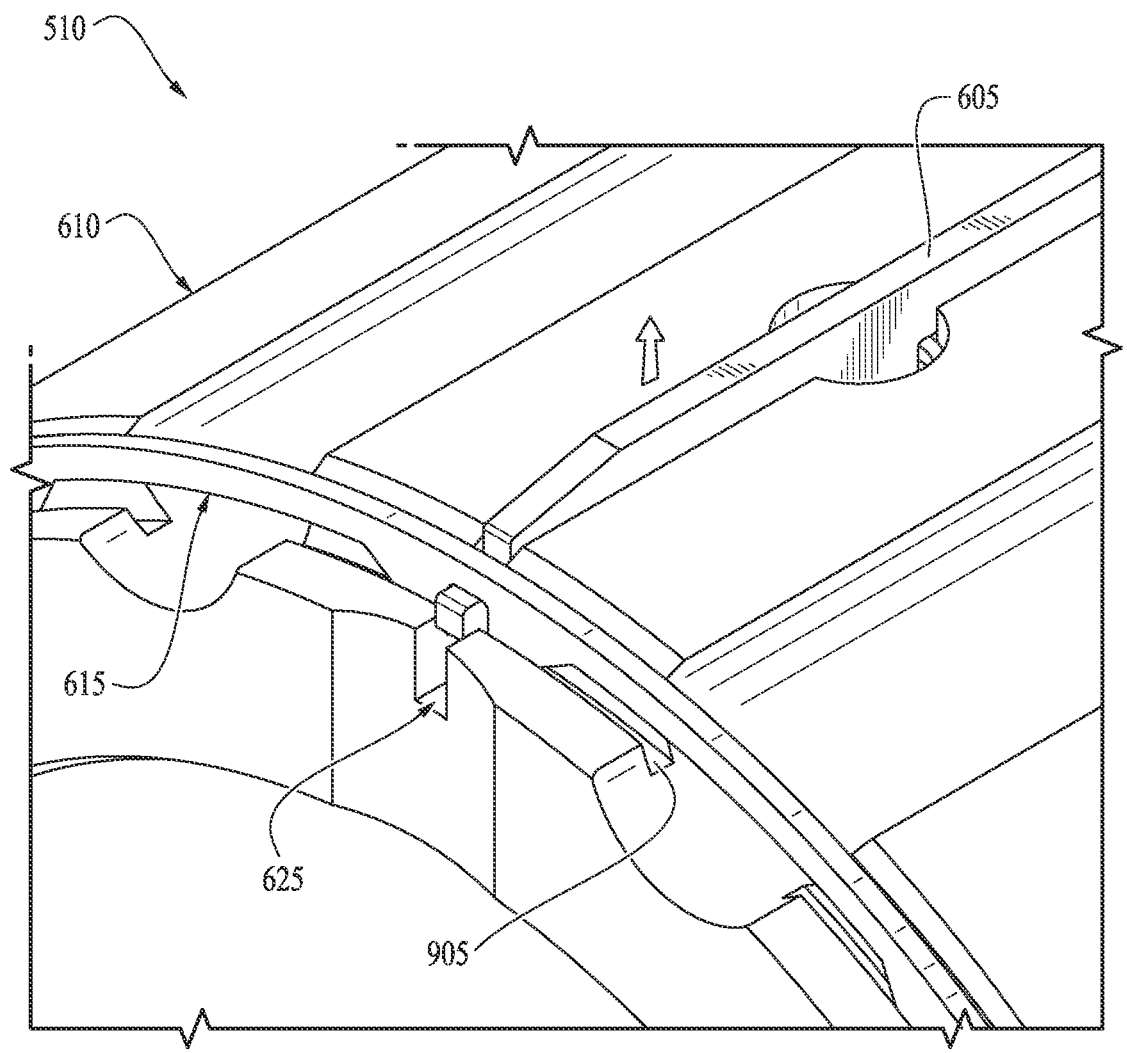
Figure 10:
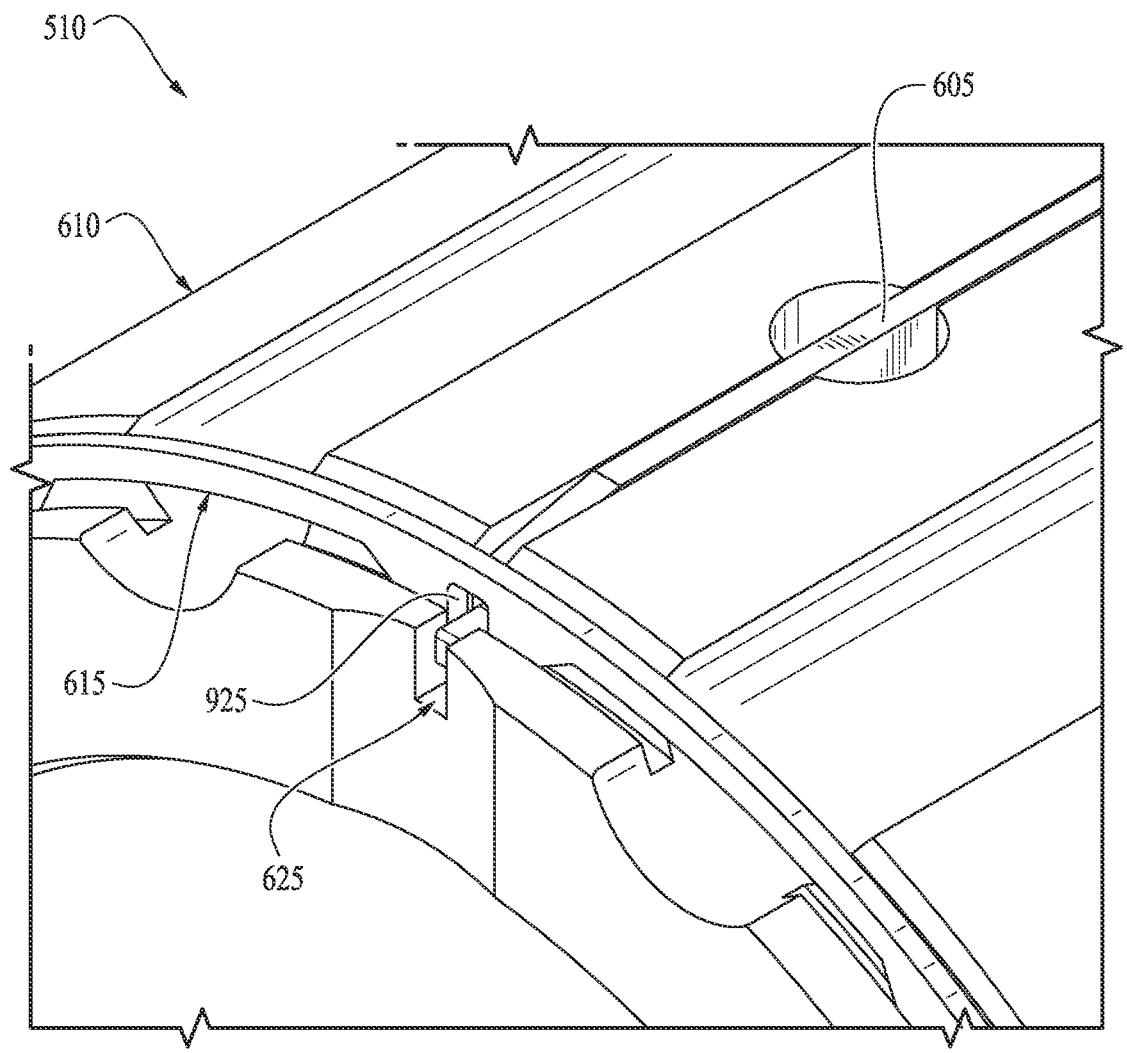
FIG. 10 is a partial isometric view of the assembled bearing bushing assembly (e.g. with the anti-rotation tab depressed to allow for insertion into a stator), according to an embodiment of the disclosure.

Each retaining plate 615 is typically a hollow cylindrical element (e.g. with an open bore) which is configured to fit within the retaining groove 905 (e.g. with a thickness less than the width of the retaining groove 905) and to affix the anti-rotation tab 605 in place on the bearing bushing 610, while allowing radial movement of the anti-rotation tab 605 within the tab axial slot 625 between an extended position (e.g. as shown in FIGS. 8 and 9D) and a retracted position (e.g. as shown in FIGS. 9A and 10). Each retaining plate 615 overlaps the one or more tab axial slot 625 and/or the one or more anti-rotation tab 605, in order to hold the one or more anti-rotation tab 605 onto the bearing bushing 610 during installation. Typically, each retaining plate 615 comprises a solid ring portion 910 (e.g. an upper continuous section), spanning a full circumference (e.g. without breaks or gaps). In embodiments, each retaining plate 615 can comprise one or more tang 920. For example, the one or more tang 920 can extend radially inward from the ring portion 910 of the retaining plate 615, as shown in FIG. 9A.

In embodiments, the bearing bushing 610 can comprise one or more passage axial slot 630 (e.g. oil flow passage slot) in the outer surface of the bearing bushing 610, which can be circumferentially offset from but approximately parallel to the tab axial slot 625. While the passage axial slots 630 in FIG. 6 are shown as extending the entire axial length of the bearing bushing 610, in other embodiments the passage axial slot 630 can extend at least from the axial end of the bearing bushing 610 to the retaining groove 905. Typically, the passage axial slot 630 can be wider than the tab axial slot 625 (e.g. to allow passage of the tang 920 into the retaining groove 905, as discussed below). The retaining groove 905 intersects the passage axial slot 630. In embodiments, the passage axial slot 630 can be deeper than the retaining groove 905.

The retaining plate 615 can comprise at least one tang 920 extending radially inward (e.g. from the ring portion 910), as shown in FIG. 9A. The tang 920 comprises a gap 925 extending (e.g. radially) from a tang distal end 922 towards the outer surface of the retaining plate 615 and/or the ring portion 910. For example, the tang gap 925 can comprise sufficient depth to interface with the anti-rotation tab 605 to allow radial movement of the anti-rotation tab 605 between an extended position (e.g. with anti-rotation tab 605 projecting out of the outer surface of the bearing bushing 610) and a retracted (e.g. flush or sub-flush) position. The tang 920 is configured (e.g. based on size and/or geometry) to slidably fit within the passage axial slot 630 (e.g. to allow axial insertion within a corresponding passage axial slot 630, as discussed below). For example, the passage axial slot 630 can be at least as wide or wider than the tang 920. Typically, the tang 920 is wider than the tab axial slot 625 and extends radially inward sufficiently in the retaining groove 905 so that, when the tang 920 is not aligned with the passage axial slot 630, the retaining plate 615 cannot move axially out of the retaining groove 905 (e.g. the tang 920 extends sufficiently within the retaining groove 905 to overlap axially, for example with the inner diameter of the retaining ring at the distal end 922 of the tang 920 a relatively close fit to the outer diameter of the retaining groove 905).

When the retaining plate 615 is disposed in the retaining groove 905 and positioned to hold the anti-rotation tab 605 onto the bearing bushing 610, the tang gap 925 is aligned with the tab axial slot 625. In embodiments, the anti-rotation tab 605 upper surface 715 can be designed to ensure that, when the anti-rotation tab 605 extends into the corresponding slot in the stator 210 (e.g. the extended position), the anti-rotation tab 605 is just being held by the top of the tang gap 925. In embodiments, the tang 920 can comprise at least one angled side 923 (e.g. with base of the tang 920 at connection to the ring portion 910 wider than the tang distal end 922 and/or with the tang 920 configured with a wedge-shape which can push the anti-rotation tab 605 into the retracted position as the retaining plate 615 is rotated within the retaining groove 905). In some embodiments, the tang 920 may have two angled sides 923 and be configured as a wedge which pushes the anti-rotation tab 605 into the compressed position as the retaining plate 615 is rotated within the retaining groove 905 (e.g. regardless of the direction of rotation). While the angled side(s) 923 may be set at any angle (e.g. typically that does not result in a side extending precisely perpendicular to the ring portion 910 connection), typically the base of the tang 920 is sufficiently wider than the tang distal end 922 to assist with the wedging action.

In embodiments, each tab axial slot 625 and corresponding spring recess 620 can have substantially the same depth (e.g. extend approximately the same distance inward from the outer surface). In embodiments, the spring recess 620 can comprise a depth based on the spring load requirement and the available springs to meet this load. For example, the spring working height (e.g. height when the rated load is applied) can be used to set the depth of the spring recess 620, between the bottom surface of the anti-rotation tab 605 and the bottom of the spring recess 620. In embodiments, the biasing element 705 (e.g. spring) can be selected to allow further compression to accommodate assembly of the retaining plate 615. In embodiments, the biasing element 705 can be configured to retain the anti-rotation tab 605 axially within the tab axial slot 625.

In embodiments, each retaining plate 615 can be formed of metal, such as low alloy steel or stainless steel (such as 300 series stainless steel). In other embodiments, each retaining plate 615 can be formed of nickel alloy (such as Inconel, Incoloy, or Monel for example). In some embodiments, each retaining plate can be formed of titanium or some other non-magnetic material. In some embodiments, the bearing bushing 610 can be formed of ceramic material (e.g. having high fracture toughness and impact resistance, while providing significant flexural strength). For example, the ceramic material can comprise a zirconia compound (e.g. 3% Yttria stabilized zirconia). In some embodiments, the bearing bushing 610 can be formed of steel (e.g. 300 series stainless steel) or bronze. In embodiments, each anti-rotation tab 605 can comprise nickel alloy or stainless steel or alloy steel. For example, the anti-rotation tab 605 can be stamped from nickel alloy sheeting. Alternatively, the anti-rotation tab 605 can be water jet or laser cut. Use of non-magnetic steel or nickel alloy (e.g. for the retaining plate 615 and/or the anti-rotation tabs 605) can be useful in a PMM motor, for example minimizing eddy current losses due to interaction of the rotating magnetic field and the metallic stationary components.

In embodiments, each tab axial slot 625 can extend approximately an axial length of the bearing bushing 610. In embodiments, each spring recess 620 can be approximately centered on the length of the bearing bushing 610 (e.g. on the midpoint of the length of the corresponding tab axial slot 625). In embodiments, each biasing element 705 can be a compression spring. For example, each compression spring can be a wave-type spring, and the corresponding spring recess 620 can be a counter bore (e.g. approximately cylindrical, with approximately circular opening). Exemplary wave-type springs can have the same spring rate as a traditional round wire coil spring. Wave-type compression springs can be accommodated in thinner cross-section bearing bushings due to their reduced height, and so may be used in such applications. In other embodiments, for example as shown in FIGS. 12-16, each biasing element 705 can be a linear spring, and each spring recess 620 can be a corresponding axially extending spring slot, with the spring slot being wider than the axial slot for the anti-rotation tab 605 and the axial slot having a length greater than the length of the slot-shaped spring recess 620. Linear springs can be accommodated in thinner cross-section bearing bushings due to their reduced height, and so may be used in such applications. Although not explicitly shown, the biasing element 705 can be incorporated into/integral with the anti-rotation tab 605 (e.g. the material and/or shape of the tab may provide for an inherent biasing force, without the need for a separate biasing element/spring).

In embodiments, the anti-rotation tab 605 can have a height profile sloping upward (e.g. to a larger height) while extending axially inward, such that a central portion 710 of the anti-rotation tab 605 has a greater height than portions of the anti-rotation tab 605 in proximity to axial ends of the anti-rotation tab 605. For example, an upper surface/top 715 of the anti-rotation tab 605 is sloped/angled in proximity to both its axial ends, with a lower height at the axial end that becomes greater as the slope extends axially inward (e.g. away from the corresponding axial end and towards the center portion 710 of the anti-rotation tab 605). In embodiments, an upper surface/top 715 of each anti-rotation tab 605 can be flat at both axial ends, slope upward as extending inward, and/or have a flat center portion 710 having a height greater than the height of the flat axial ends. In embodiments, the upper surface 715 of each anti-rotation tab 605, between the two flat axial ends, is unbroken (e.g. no holes, slots, or indentations).

As noted above, the rotor bearing bushing assembly 510 can comprises a plurality of (e.g. 2-8, 2-6, 3-6, 3-4, or 3) anti-rotation tabs 605, with corresponding plurality of axial slots 625 and biasing elements 705. Typically, the plurality of anti-rotation tabs 605 are approximately evenly spaced about the circumference of the bearing bushing 610. And as noted above, typically the rotor bearing bushing assembly 510 comprises two retaining plates 615, for example with one retaining plate 615 disposed at each axial end of the bearing bushing 610. Accordingly, a retaining groove 905 may be located at each axial end of the bearing bushing 610, with the corresponding retaining plate 615 disposed therein. In some embodiments, each retaining plate 615 can include multiple tangs 920. In some embodiments, the number of tangs 920 on each retaining plate 615 can match the number and alignment (e.g. spacing) of the passage axial slots 630. In other embodiments, the number of tangs 920 on the retaining plate 615 may not correspond to the number of passage axial slots 630. For example, there may be at least as many passage axial slots 630 as tangs 920 (e.g. ten passage axial slots 630 and two tangs 920). Typically, the number of tangs 920 on each retaining plate 615 can match the number and alignment of the tab axial slots 625 (e.g. so that the tangs 920 can interface with all of the anti-rotation tabs 605).

As shown in FIGS. 9A-9D, exemplary method embodiments for assembling a bearing bushing assembly 510 (e.g. similar to that shown in FIGS. 6-8) can comprise depressing a spring-loaded anti-rotation tab 605 within a tab axial slot 625 on an exterior surface of the bearing bushing 610, wherein the spring-loaded anti-rotation tab 605 is biased radially outward (see for example FIG. 9A); aligning a tang 920 of a retaining plate 615 with a passage axial slot 630 on the exterior surface of the bearing bushing 610 (see for example FIG. 9A); axially inserting the retaining plate 615 onto the bearing bushing 610, with the tang 920 of the retaining plate 615 sliding axially within the passage axial slot 630, to align with retaining groove 905 (see for example FIG. 9B); rotating the retaining plate 615 within a retaining groove 905 on the exterior surface of the bearing bushing 610 until the anti-rotation tab aligns with a tang gap 925 in the tang 920 (see for example FIG. 9C); and releasing the anti-rotation tab 605 to seat/engage within the tang gap 925 (see for example FIG. 9D). In embodiments, aligning a tang 920 can comprise aligning a plurality of tangs 920 (e.g. all tangs 920) on the retaining plate 615 with corresponding passage axial slots 630. In embodiments, axially inserting can comprise inserting the retaining plate 615 until it (e.g. the tang(s)) 920 is aligned with the retaining groove 905. In embodiments, when the anti-rotation tab 605 is seated in the tang gap 925, there is overlap between the distal end 922 (e.g. bottom) of the tang 920 and the outer surface (e.g. top) of the anti-rotation tab 605, for example to ensure that the lowest point to which the anti-rotation tab 605 can move (e.g. during assembly of the bearing bushing 610 into the stator 210) does not release the retaining plate 615.

In embodiments, the bearing bushing 610 can comprise a hollow cylinder; the passage axial slot 630 can be circumferentially offset from the tab axial slot 625; the retaining groove 905 can intersect the tab axial slot 625 and the passage axial slot 630; the retaining plate 615 can comprise a hollow cylinder, and the tang 920 can extend radially inward from an inner surface of the hollow cylinder; after rotating the retaining plate 615 (e.g. so the tang is misaligned with the passage axial slots), the tang 920 can extend radially inward sufficiently in the retaining groove 905 so that the retaining plate 615 cannot move axially out of the retaining groove 905; and after rotating the retaining plate 615 (e.g. to align the tang gap and the tab axial slot), the tang gap 925 can interface with the anti-rotation tab 605 to allow radial movement of the anti-rotation tab 605 between an extended position and a retracted position.

In embodiments, rotating the retaining plate 615 can comprise rotating the retaining plate 615 until an angled side 923 of the tang 920 contacts the anti-rotation tab 605, with continued rotation wedging the anti-rotation tab 605 inward sufficiently to allow the tang gap 925 to be aligned with the tab axial slot 625. Embodiments can further comprise depressing the anti-rotation tab 605 within the tab axial slot 625 for insertion of the bearing bushing assembly 510 into a stator 210 of an ESP motor, wherein depressing the anti-rotation tab 605 is not sufficient to release the anti-rotation tab 605 from the tang gap 925 (e.g. see FIG. 10). Embodiments can further comprise, while the anti-rotation key is depressed: aligning a tang 920 of a second retaining plate 615 with the passage axial slot 630 on the exterior surface of the bearing bushing 610; axially inserting the second retaining plate 615 onto the bearing bushing 610, with the tang 920 of the second retaining plate 615 sliding axially within the passage axial slot 630; and rotating the second retaining plate 615 within a corresponding second retaining groove 905 on the exterior surface of the bearing bushing 610 until the anti-rotation tab 605 aligns with a tang gap 925 in the tang 920 of the second retaining plate 615.

Figure 11:
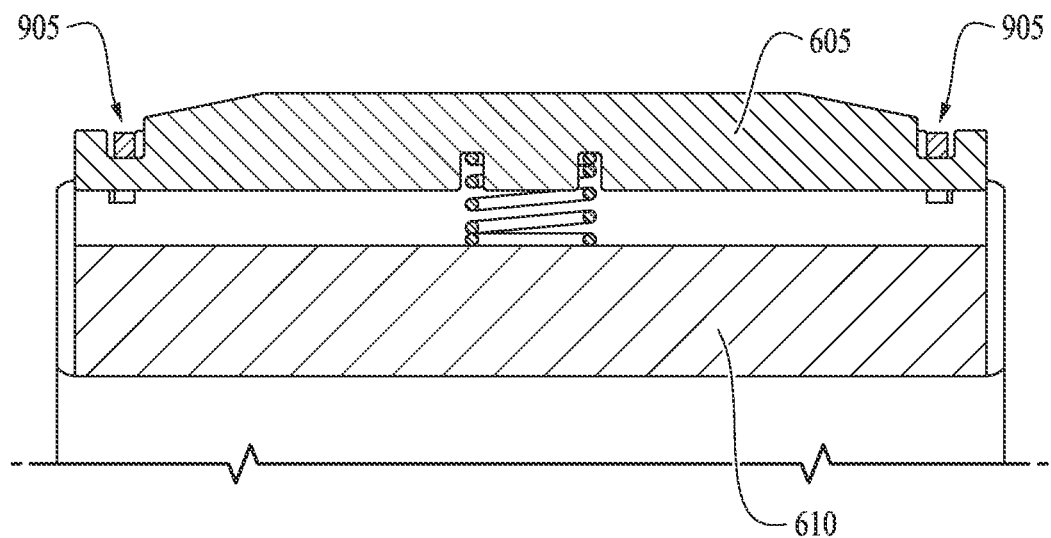
FIG. 11 is a partial axial cross-sectional view of an alternate embodiment of a bearing bushing assembly in which the anti-rotation tabs include a retaining groove for interaction with the retaining plate, according to an embodiment of the disclosure.

FIG. 11 illustrates a similar embodiment, which can be used when there are a plurality (e.g. typically at least three) anti-rotation tabs 605. In the embodiment shown in FIG. 11, the retaining groove 905 is not disposed on the surface of the bearing bushing 610, but rather is formed on the upper/exterior surface 715 of the anti-rotation tabs 605. For example, the plurality of anti-rotation tabs 605 can be spaced approximately evenly about the circumference of the bearing bushing 610, and each anti-rotation tab 605 can have a slot in proximity to its axial end (e.g. all at the same axial end of the bearing bushing 610). All of the slots on the same axial end of the bearing bushing 610 can jointly form the retaining groove 905 for one retaining plate 615. If two retaining plates 615 are to be used on the bearing bushing 610 (as in FIG. 11), each anti-rotation tab 605 can have a slot at each axial end, with the slots then jointly forming two retaining grooves 905 (e.g. one at each axial end of the bearing bushing 610). In some embodiments, the bearing bushing 610 can have a stepped-down portion in proximity to one or both axial end.

Figure 12:
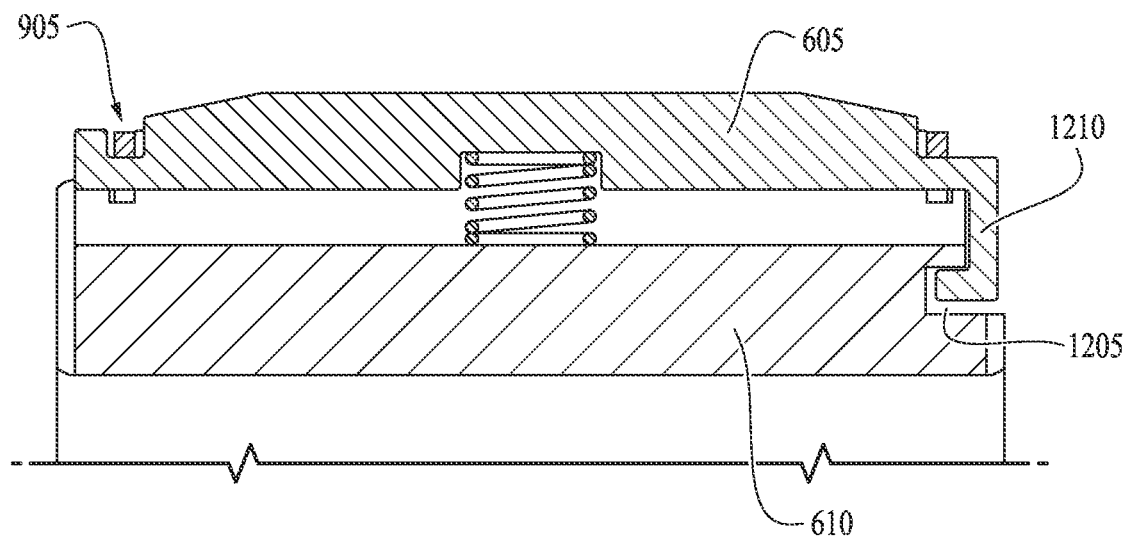
FIG. 12 is a partial axial cross-sectional view of another alternate embodiment configured for secure retention of the anti-rotation tab using only a single retaining plate at one axial end of the bearing bushing, according to an embodiment of the disclosure.

FIG. 12 illustrates yet another similar embodiment, configured for use with only a single retaining plate 615 (e.g. at one axial end of the bearing bushing 610). In the embodiment shown in FIG. 12, the bearing bushing 610 can comprises a side indentation 1205 (e.g. hook slot) at an opposite axial end from the retaining groove 905, and the anti-rotation tab 605 can comprise a corresponding hook element 1210 (e.g. at axial end opposite the retaining groove 905) which is configured for retention (e.g. to catch) within the side indentation 1205. In embodiments, the side indentation 1205 can be disposed on the side surface of the bearing bushing 610 in alignment with the tab axial slot 625. In embodiments, the side indentation 1205 can be configured (e.g. with a depth) to allow the anti-rotation tab 605 to move between the extended position and the retracted position when the hook element 1210 is disposed in the side indentation 1205.

As FIGS. 13A and 13B illustrate, similar retention techniques can be used for anti-rotation tabs 605 disposed on an inner surface of a journal sleeve 505 of a bearing assembly (e.g. to allow for engagement of the journal sleeve 505 with a corresponding slot in the drive shaft 220 (e.g. about which the journal sleeve is concentrically disposed) so they rotate together as a whole). The spring-loaded anti-rotation tab 605 can be disposed in a tab axial slot 625 on the inner surface of the journal sleeve 505, and the retaining groove 905 can also be located on the inner surface (e.g. extending circumferentially and intersecting the tab axial slot 625). The passage axial slot 630 (e.g. oil flow passage slot) can be located on the inner surface of the journal sleeve 505 and can be circumferentially offset from the tab axial slot 625. The retaining plate 615, with tang 920 extending radially outward, can fit into the retaining groove 905, and when the tang 920 is aligned with the tab axial slot 625, the anti-rotation tab 605 can be held in place on the journal sleeve 505 while still being able to move radially between an extended and retracted position.

In fact, as schematically illustrated in FIG. 14, a similar arrangement can be used: (1) for anti-rotation tabs 605 configured to engage a bearing bushing 610 to a stator 210 for rotation together, (a) with the anti-rotation tab 605 extending out of the bearing bushing 610 to engage a slot in the stator 210 as shown at A or (b) with the anti-rotation tab 605 extending out of the stator 210 to engage a slot in the bearing bushing 610 as shown at B; or (2) for anti-rotation tabs 605 configured to engage a journal sleeve 505 to a drive shaft 220 for rotation together, (a) with the anti-rotation tab 605 extending out of the journal sleeve 505 to engage a slot in the drive shaft 220 as shown at C or (b) with the anti-rotation tab 605 extending out of the drive shaft 220 to engage a slot in the journal sleeve 505 as shown at D. These illustrations demonstrate that the approach disclosed herein can be used broadly to rotationally couple any two cylindrical motor elements (e.g. of an ESP motor).

For example, an assembly for an ESP motor can comprise a cylindrical motor element; a spring-loaded anti-rotation tab 605 biased radially away from a surface of the cylindrical motor element; a retaining groove 905; and a cylindrical retaining plate 615 with an open bore, which is configured to fit within the retaining groove 905 and to affix the anti-rotation tab 605 to the cylindrical motor element while allowing radial movement of the anti-rotation tab 605 between an extended position and a retracted position. The cylindrical motor element may be hollow or solid (e.g. depending on the circumstances), and can be selected from the following: a stator 210, a drive shaft 220, a journal sleeve 505, and a bearing bushing 610. The surface of the cylindrical motor element from which the anti-rotation tab 605 is biased away will depend on which particular cylindrical motor element is at issue. For example, the surface would be an exterior surface for the bearing bushing 610 or the drive shaft 220, but would be an inner surface for the stator 210 or the journal sleeve 505. The retaining plate 615 typically comprises a solid ring portion 910, spanning a full circumference. The retaining groove 905 typically is circumferentially disposed on the surface of the cylindrical motor element.

In embodiments, as shown for example in FIG. 14, the anti-rotation tab 605 can fit and extend axially in a tab axial slot 625 disposed on the surface of the cylindrical motor element, wherein the tab axial slot 625 intersects the retaining groove 905 on the surface of the cylindrical motor element, and the anti-rotation tab 605 is radially slidable within the tab axial slot 625 between the extended position and the retracted position. The surface of the cylindrical motor element can comprise a passage axial slot 630 which is circumferentially offset from but approximately parallel to the tab axial slot 625. The passage axial slot 630 is typically wider than the tab axial slot 625. The retaining groove 905 intersects the passage axial slot 630 on the surface of the cylindrical motor element. In embodiments, the passage axial slot 630 can be deeper than the retaining groove 905.

The retaining plate 615 comprises at least one tang 920 extending radially from the ring portion 910 of the retaining plate 615. For example, for embodiments in which the surface of the cylindrical motor element at issue is an exterior surface, the tang 920 projects radially inward (e.g. to fit within the retaining groove 905 on the exterior surface); for embodiments in which the surface of the cylindrical motor element at issue is an inner surface, the tang 920 projects radially outward (e.g. to fit within the retaining groove 905 on the inner surface). The tang 920 is wider than the tab axial slot 625, but is configured to slidably fit within the passage axial slot 630 (e.g. with the passage axial slot 630 being at least as wide and/or as deep as the tang 920). While the passage axial slot(s) 630 are shown as a portion of a circle in the exemplary figures, other shaped (e.g. rectangular, square, triangular) can be used, with the shape of the tang 920 typically then corresponding to fit within the passage axial slots 630. In embodiments, the geometry/shape of the tang(s) 920 does not need to match the passage axial slots 630, so long as the tang(s) 920 will slidably fit therein. In embodiments, the retaining groove 905 can have a depth that is sufficient to ensure overlap with the retaining plate 615, when the retaining plate 615 is disposed within the retaining groove 905. In embodiments, a distal end 922 of the tang 920 can overlap with an upper surface 715 of the anti-rotation tab 605, when the tang 920 is aligned with the tab axial slot 625. The tang 920 comprises a gap, and the tang gap 925 can comprise a depth sufficient to interface with the anti-rotation tab 605 to allow radial movement of the anti-rotation tab 605 between the extended position and the retracted position. When the tang 920 is positioned to retain the anti-rotation tab 605, the tang gap 925 is aligned with the tab axial slot 625, and the tang 920 extends radially sufficiently into the retaining groove 905 so that the retaining plate 615 cannot move axially out of the retaining groove 905. In embodiments, the tang 920 can comprise at least one angled side 923 (and typically two angled sides 923), forming a wedge-shape that assists in allowing the tang 920 to rotate past contact with the anti-rotation tab 605 so that the tang gap 925 can align with the tab axial slot 625.

In embodiments, the anti-rotation tab 605 itself can be formed as a spring, so that no additional biasing element may be needed (e.g. the biasing element may be integral to the spring-loaded anti-rotation tab 605). Alternatively, a separate biasing element 705 (such as a compression spring) can be used to bias the anti-rotation tab 605. For example, a spring recess 620 can be disposed on the surface of the cylindrical motor element, and the tab axial slot 625 can intersect the spring recess 620. The biasing member can be disposed in the spring recess 620 and configured to bias the anti-rotation tab 605 in the tab axial slot 625 towards its extended position. Similar to the discussion above with regard to the specific bearing bushing embodiments shown in FIGS. 11-12, in embodiments the retaining groove 905 can be formed in the anti-rotation tabs 605 (rather than or in addition to the cylindrical motor element) and/or a hook element 1210 and side indentation 1205 can be used to hold one side of the anti-rotation tab 605 to the cylindrical motor element, so that only a single retaining plate 615 may be needed to hold the anti-rotation tab 605 to the cylindrical motor element.

In embodiments, the assembly for an ESP motor can comprises a plurality of (e.g. 2-8, 2-6, 3-6, 3-4, or 3) anti-rotation tabs 605, with corresponding plurality of axial slots 715 and/or biasing elements 705. Typically, the plurality of anti-rotation tabs 605 are approximately evenly spaced about the circumference of the cylindrical motor element. In embodiments, the assembly for an ESP motor can comprise two retaining plates 615, for example with one retaining plate 615 disposed at each axial end of the cylindrical motor element. Accordingly, a retaining groove 905 may be located at each axial end of the cylindrical motor element, with the corresponding retaining plate 615 disposed therein.

Methods for generally securing an anti-rotation tab 605 onto a cylindrical motor element can be similar to the methods described above specifically with respect to the bearing bushing assembly 510 and/or may relate to cylindrical motor element embodiments as described above. For example, methods of retaining an anti-rotation tab 605 onto a cylindrical motor element of an ESP motor (e.g. wherein the cylindrical motor element may be solid or hollow), can comprise: depressing a spring-loaded anti-rotation tab 605 within a tab axial slot 625 on a surface of the cylindrical motor element (e.g. until flush or sub-flush), wherein the spring-loaded anti-rotation tab 605 is biased radially away from the cylindrical motor element; aligning a tang 920 of a retaining plate 615 with a passage axial slot 630 on the surface of the cylindrical motor element; axially inserting the retaining plate 615 onto the cylindrical motor element, with the tang 920 of the retaining plate 615 sliding axially within the passage axial slot 630; rotating the retaining plate 615 within a retaining groove 905 on the surface of the cylindrical motor element until the anti-rotation tab 605 aligns with a tang gap 925 in the tang 920, and releasing the anti-rotation tab 605 to seat within the tang gap 925.

In embodiments, the passage axial slot 630 is circumferentially offset from the tab axial slot 625; the retaining groove 905 intersects the tab axial slot 625 and the passage axial slot 630; the retaining plate 615 comprises a hollow cylinder, and the tang 920 extends radially from the hollow cylinder (e.g. from the solid ring portion 910 which spans an entire circumference). In embodiments, after rotating the retaining plate 615, the tang 920 extends sufficiently in the retaining groove 905 so that the retaining plate 615 cannot move axially out of the retaining groove 905. In embodiments, after rotating the retaining plate 615 (e.g. to align the tang gap 925 and the tab axial slot 625), the tang gap 925 interfaces with the anti-rotation tab 605 to allow radial movement of the anti-rotation tab 605 between an extended position and a retracted (e.g. flush or sub-flush) position. In embodiments, the tang 920 comprises at least one angled side 923 (e.g. configured as a wedge which pushes the anti-rotation tab 605 into the retracted position as the retaining plate 615 is rotated within the retaining groove 905). In some embodiments, the tang 920 comprises two angles sides (e.g. opposite one another), which may allow for effective rotation of the retaining plate 615 either direction in the retaining groove 905. In embodiment, rotating the retaining plate 615 can comprise rotating the retaining plate 615 until an angled side 923 of the tang 920 contacts the anti-rotation tab 605, with continued rotation wedging the anti-rotation tab 605 inward sufficiently (e.g. to a sub-flush level) to allow the tang gap 925 to be aligned with the tab axial slot 625.

When the anti-rotation tab 605 is seated in the tang gap 925 of the retaining plate 615, the anti-rotation tab 605 can be held onto the cylindrical motor element, while allowing the anti-rotation tab 605 to move radially within the tab axial slot 625 between the extended position and the retracted position. Some embodiments can further comprise installing a biasing element 705 into a corresponding spring recess 620 on the surface of the cylindrical motor element, wherein the tab axial slot 625 intersects the spring recess 620; and installing the anti-rotation tab 605 in the tab axial sot on the surface of the cylindrical motor element, wherein the biasing element 705 biases the anti-rotation tab 605 towards the extended position. Some embodiments can further comprise, while the anti-rotation key is depressed: aligning a tang 920 of a second retaining plate 615 with the passage axial slot 630 on the surface of the cylindrical motor element; axially inserting the second retaining plate 615 onto the cylindrical motor element, with the tang 920 of the second retaining plate 615 sliding axially within the passage axial slot 630; and rotating the second retaining plate 615 within a corresponding second retaining groove 905 on the surface of the cylindrical motor element until the anti-rotation tab 605 aligns with a tang gap 925 in the tang of the second retaining plate 615. In embodiments, aligning the tang 920 of the second retaining plate may comprise aligning the tang of the second retaining plate with the same passage axial slot 630 as use for the first retaining plate, while in other embodiments, the tang 920 of the second retaining plate can be aligned with a different passage axial slot 630.

Similar method embodiments may also be used with respect to the pump and/or the seal sections (e.g. of an ESP assembly), as these can have similar bearings. For example, retaining plate(s) similar to those described herein may be used in a similar manner (as described herein) with respect to cylindrical pump and/or seal elements, which may for example be configured with one or more anti-rotation tab.

Additional Disclosure

The following are non-limiting, specific embodiments in accordance with the present disclosure:

In a first embodiment, a bearing bushing assembly (e.g. for an ESP motor) can comprise a substantially cylindrical bearing bushing comprising: a spring recess extending inward from an outer surface of the bearing bushing, a tab axial slot in the outer surface of the bearing bushing, wherein the tab axial slot intersects the spring recess, and a circumferential retaining groove in the outer surface of the bearing bushing, wherein the retaining groove intersects the tab axial slot; an anti-rotation tab configured to fit and extend axially in the tab axial slot, the anti-rotation tab being radially slidable within the tab axial slot; a biasing element configured to fit in the spring recess and to push radially outward on the anti-rotation tab in the tab axial slot; and a cylindrical retaining plate with an open bore, wherein the retaining plate is configured to fit within the retaining groove and to retain the anti-rotation tab within the tab axial slot, and wherein the retaining plate comprises a solid ring portion, spanning a full circumference.

A second embodiment can include the bearing bushing assembly of the first embodiment, wherein: the bearing bushing comprises one or more passage axial slot in the outer surface of the bearing bushing which is circumferentially offset from but approximately parallel to the tab axial slot, wherein the passage axial slot is wider than the tab axial slot, the retaining groove intersects the passage axial slot, and the passage axial slot is deeper than the retaining groove; and the retaining plate comprises at least one tang extending radially inward from the ring portion, wherein the tang comprises a gap extending from a tang distal end towards the ring portion, and the tang is configured to slidably fit within the passage axial slot.

A third embodiment can include the bearing bushing assembly of the second embodiment, wherein the tang is wider than the tab axial slot and extends radially inward sufficiently in the retaining groove so that, when the tang is not aligned with the passage axial slot, the retaining plate cannot move axially out of the retaining groove.

A fourth embodiment can include the bearing bushing assembly of the second or third embodiments, wherein the tang gap is aligned with the tab axial slot.

A fifth embodiment can include the bearing bushing assembly of any one of the second to fourth embodiments, wherein the tang gap comprises a depth to interface with the anti-rotation tab to allow radial movement of the anti-rotation tab between an extended position and a retracted position.

A sixth embodiment can include the bearing bushing assembly of any one of the second to fifth embodiments, wherein the tang comprises at least one angled side.

A seventh embodiment can include the bearing bushing assembly of any one of the first to sixth embodiments, further comprising a second retaining plate, similar to the first retaining plate, and a corresponding second retaining groove, similar to the first retaining groove.

An eighth embodiment can include the bearing bushing assembly of any one of the first to seventh embodiments, wherein the biasing element is integral with the anti-rotation tab.

In a ninth embodiment, a method for assembling a bearing bushing assembly can comprise depressing a spring-loaded anti-rotation tab within a tab axial slot on an exterior surface of the bearing bushing, wherein the spring-loaded anti-rotation tab is biased radially outward; aligning a tang of a retaining plate with a passage axial slot on the exterior surface of the bearing bushing; axially inserting the retaining plate onto the bearing bushing, with the tang of the retaining plate sliding axially within the passage axial slot; rotating the retaining plate within a retaining groove on the exterior surface of the bearing bushing until the anti-rotation tab aligns with a tang gap in the tang; and releasing the anti-rotation tab to seat within the tang gap.

A tenth embodiment can include the method of the ninth embodiment, wherein: the bearing bushing comprises a hollow cylinder; the passage axial slot is circumferentially offset from the tab axial slot; the retaining groove intersects the tab axial slot and the passage axial slot; the retaining plate comprises a hollow cylinder, and the tang extends radially inward from an inner surface of the hollow cylinder; after rotating the retaining plate, the tang extends radially inward sufficiently in the retaining groove so that the retaining plate cannot move axially out of the retaining groove; and after rotating the retaining plate, the tang gap interfaces with the anti-rotation tab to allow radial movement of the anti-rotation tab between an extended position and a retracted position.

An eleventh embodiment can include the method of the ninth or tenth embodiments, wherein rotating the retaining plate comprises rotating the retaining plate until an angled side of the tang contacts the anti-rotation tab, with continued rotation wedging the anti-rotation tab inward sufficiently to allow the tang gap to be aligned with the tab axial slot.

A twelfth embodiment can include the method of any one of the ninth to eleventh embodiments, further comprising depressing the anti-rotation tab within the tab axial slot for insertion of the bearing bushing assembly into a stator of an ESP motor, wherein depressing the anti-rotation tab is not sufficient to release the anti-rotation tab from the tang gap.

A thirteenth embodiment can include the method of any one of the ninth to the twelfth embodiments, further comprising, while the anti-rotation tab is depressed: aligning a tang of a second retaining plate with the passage axial slot on the exterior surface of the bearing bushing; axially inserting the second retaining plate onto the bearing bushing, with the tang of the second retaining plate sliding axially within the passage axial slot; and rotating the second retaining plate within a corresponding second retaining groove on the exterior surface of the bearing bushing until the anti-rotation tab aligns with a tang gap in the tang of the second retaining plate.

In a fourteenth embodiments, an assembly for an ESP motor can comprise: a cylindrical motor element of the ESP motor; a spring-loaded anti-rotation tab biased radially away from a surface of the cylindrical motor element; a retaining groove; and a cylindrical retaining plate with an open bore, wherein the retaining plate is configured to fit within the retaining groove and to affix the anti-rotation tab to the cylindrical motor element, while allowing radial movement of the anti-rotation tab between an extended position and a retracted position; wherein the retaining plate comprises a solid ring portion, spanning a full circumference.

A fifteenth embodiment can include the assembly of the fourteenth embodiment, wherein the retaining groove is circumferentially disposed on the surface of the cylindrical motor element.

A sixteenth embodiment can include the assembly of the fifteenth embodiment, wherein the anti-rotation tab fits and extends axially in a tab axial slot disposed on the surface of the cylindrical motor element, wherein the tab axial slot intersects the retaining groove, and the anti-rotation tab is radially slidable within the tab axial slot between the extended position and the retracted position.

A seventeenth embodiment can include the assembly of the sixteenth embodiment, wherein: the surface of the cylindrical motor element comprises a passage axial slot which is circumferentially offset from but approximately parallel to the tab axial slot, wherein the passage axial slot is wider than the tab axial slot, and the retaining groove intersects the passage axial slot; and the retaining plate comprises at least one tang extending radially from the ring portion of the retaining plate, wherein the tang comprises a gap, the tang is wider than the tab axial slot, the tang is configured to slidably fit within the passage axial slot, and the tang gap comprises a depth sufficient to interface with the anti-rotation tab to allow radial movement of the anti-rotation tab between the extended position and the retracted position.

An eighteenth embodiment can include the assembly of the seventeenth embodiment, wherein the tang gap is aligned with the tab axial slot, and the tang extends radially sufficiently into the retaining groove so that the retaining plate cannot move axially out of the retaining groove.

A nineteenth embodiment can include the assembly of seventeenth or eighteenth embodiment, wherein the tang comprises at least one angled side.

A twentieth embodiment can include the assembly of one of the fourteenth to nineteenth embodiments, further comprising at least one additional spring-loaded anti-rotation tab, similar to the first anti-rotation tab, wherein the retaining groove is disposed on an exterior surface of the anti-rotation tabs, and wherein the anti-rotation tabs are disposed circumferentially on the surface of the cylindrical motor element.

A twenty-first embodiment can include the assembly of any one of the fourteenth to the twentieth embodiments, wherein the biasing element is integral with the anti-rotation tab.

In a twenty-second embodiment, an assembly for an ESP motor can comprise: two cylindrical motor elements of the ESP motor which are concentrically disposed; a spring-loaded anti-rotation tab biased to extend between and engage both of the two cylindrical motor elements so that the two cylindrical motor elements rotate together; a retaining groove; and a cylindrical retaining plate with an open bore; wherein the retaining plate is configured to fit within the retaining groove and to affix the anti-rotation tab to one of the two cylindrical motor elements, while allowing radial movement of the anti-rotation tab between an extended position and a retracted (e.g. flush or sub-flush) position; wherein the retaining plate comprises a solid ring portion, spanning a full circumference.

A twenty-third embodiment can include the assembly of the twenty-second embodiment, wherein the two cylindrical motor elements can comprise either (a) a stator and a bearing bushing or (b) a journal sleeve and a drive shaft.

A twenty-fourth embodiment can include the assembly of the twenty-second or twenty-third embodiments, wherein the retaining groove is disposed in proximity to an axial end of one of the two cylindrical motor elements.

A twenty-fifth embodiment can include the assembly of any one of the twenty-second to twenty-fourth embodiments, wherein the retaining groove is circumferentially disposed on a surface of one of the two cylindrical motor elements.

A twenty-sixth embodiment can include the assembly of any one of the twenty-second to twenty-fifth embodiments, wherein the anti-rotation tab fits and extends axially in a tab axial slot disposed on the surface of one of the two cylindrical motor elements, wherein the tab axial slot intersects the retaining groove, and wherein the anti-rotation tab is radially slidable within the tab axial slot (e.g. between the extended position and the retracted position).

A twenty-seventh embodiment can include the assembly of the twenty-sixth embodiment, further comprising a spring recess disposed on the surface of one of the two cylindrical motor elements, wherein the tab axial slot intersects the spring recess; and a biasing element configured to fit in the spring recess and to bias the anti-rotation tab in the tab axial slot (e.g. towards the extended position).

A twenty-eighth embodiment can include the assembly of any one of the twenty-second to the twenty seventh embodiments, wherein the retaining plate has a thickness less than the width of the retaining groove (e.g. so that the retaining plate can fit in and/or rotate within the retaining groove).

A twenty-ninth embodiment can include the assembly of any one of the twenty-sixth to twenty-eighth embodiments, wherein the surface of one of the two cylindrical motor elements comprises a passage axial groove which is circumferentially offset from but approximately parallel to the tab axial slot, wherein the passage axial slot is wider than the tab axial slot (e.g. to allow passage of the tang into the retention slot), and wherein the retaining groove intersects the passage axial slot; and wherein the retaining plate comprises at least one tang extending from the ring portion of the retaining plate, wherein the tang comprises a gap, the tang is wider than the tab axial slot, and the tang is configured to slidably fit within the passage axial slot (e.g. the tang is not as wide as the passage axial slot).

A thirtieth embodiment can include the assembly of the twenty-ninth embodiment, wherein the tang extends radially sufficiently into the retaining groove so that, when the tang is not aligned with the passage axial slot, the retaining plate cannot move axially out of the retaining groove A thirty-first embodiment can include the assembly of the twenty-ninth or thirtieth embodiments, wherein the tang gap is aligned with the tab axial slot.

A thirty-second embodiment can include the assembly of any one of the twenty-ninth to the thirty-first embodiments, wherein the tang gap comprises a depth sufficient to interface with the anti-rotation tab to allow radial movement of the anti-rotation tab between the extended position (e.g. with anti-rotation tab projecting out of the outer surface of the bearing bushing) and the retracted (e.g. flush or sub-flush) position.

A thirty-third embodiment can include the assembly of any one of the twenty-ninth to the thirty-second embodiments, wherein the tang comprises at least one angled side (e.g. with a base of the tang at a connection to the ring portion wider than the distal end of the tang and/or configured as a wedge which pushes the anti-rotation tab into the retracted position as the retaining plate is rotated within the retaining groove).

A thirty-fourth embodiment can include the assembly of any one of the twenty-ninth to the thirty-third embodiments, wherein the tang comprises two angled sides.

A thirty-fifth embodiment can include the assembly of any one of the twenty-second to thirty-fourth embodiments, wherein a height of the anti-rotation tab increases as extending axially inward (e.g. from both axial ends).

A thirty-sixth embodiment can include the assembly of any one of the twenty-second to thirty-fifth embodiments, further comprising a second retaining ring, similar to the first retaining ring, along with a corresponding second retaining groove, wherein the second retaining groove is similar to the first retaining groove but is circumferentially disposed on the surface of one of the two cylindrical motor elements at an opposite axial end from the first retaining groove.

A thirty-seventh embodiment can include the assembly of any one of the twenty-second to twenty-fourth embodiments, further comprising at least one additional spring-loaded anti-rotation tab, similar to the first anti-rotation tab, wherein the retaining groove is disposed on an exterior (e.g. upper) surface of the anti-rotation tabs, and wherein the anti-rotation tabs are disposed circumferentially on a surface of one of the two cylindrical motor elements.

In a thirty-eighth embodiment, a method of retaining an anti-rotation tab onto a cylindrical motor element of an ESP motor (e.g. wherein the cylindrical motor element may be solid or hollow), can comprise: depressing a spring-loaded anti-rotation tab within a tab axial slot on a surface of the cylindrical motor element (e.g. until flush or sub-flush), wherein the spring-loaded anti-rotation tab is biased radially away from the cylindrical motor element; aligning a tang of a retaining plate with a passage axial slot on the surface of the cylindrical motor element; axially inserting the retaining plate onto the cylindrical motor element, with the tang of the retaining plate sliding axially within the passage axial slot; rotating the retaining plate within a retaining groove on the surface of the cylindrical motor element until the anti-rotation tab aligns with a tang gap in the tang, and releasing the anti-rotation tab to seat within the tang gap.

A thirty-ninth embodiment can include the method of the thirty-eighth embodiment, wherein: the passage axial slot is circumferentially offset from the tab axial slot; the retaining groove intersects the tab axial slot and the passage axial slot; the retaining plate comprises a hollow cylinder, and the tang extends radially from the hollow cylinder (e.g. from the solid ring portion which spans an entire circumference); after rotating the retaining plate, the tang extends sufficiently in the retaining groove so that the retaining plate cannot move axially out of the retaining groove; and/or after rotating the retaining plate, the tang gap interfaces sufficiently with the anti-rotation tab to allow radial movement of the anti-rotation tab between an extended position and a retracted (e.g. flush or sub-flush) position.

A fortieth embodiment can include the method of the thirty-eighth or thirty-ninth embodiments, wherein the tang comprises at least one angled side (e.g. configured as a wedge which pushes the anti-rotation tab into the retracted position as the retaining plate is rotated within the retaining groove).

A forty-first embodiment can include the method of any one of the thirty-eighth to fortieth embodiments, wherein rotating the retaining plate comprises rotating the retaining plate until an angled side of the tang contacts the anti-rotation tab, with continued rotation wedging the anti-rotation tab inward sufficiently (e.g. to a sub-flush level) to allow the tang gap to be aligned with the tab axial slot.

A forty-second embodiment can include the method of any one of the thirty-eighth to forty-first embodiments, wherein, when the anti-rotation tab is seated in the tang gap of the retaining plate, the anti-rotation tab is held onto the cylindrical motor element, while allowing the anti-rotation tab to move radially within the tab axial slot between the extended position and the retracted position.

A forty-third embodiment can include the method of any one of the thirty-eighth to forty-second embodiments, further comprising installing a biasing element into a corresponding spring recess on the surface of the cylindrical motor element, wherein the tab axial slot intersects the spring recess; and installing the anti-rotation tab in the tab axial sot on the surface of the cylindrical motor element, wherein the biasing element biases the anti-rotation tab towards the extended position.

A forty-fourth embodiment can include the method of any one of the thirty-eighth to forty-third embodiments, further comprising, while the anti-rotation key is depressed: aligning a tang of a second retaining plate with the passage axial slot on the surface of the cylindrical motor element; axially inserting the second retaining plate onto the cylindrical motor element, with the tang of the second retaining plate sliding axially within the passage axial slot; and rotating the second retaining plate within a corresponding second retaining groove on the surface of the cylindrical motor element until the anti-rotation tab aligns with a tang gap in the tang of the second retaining plate.

In a forty-fifth embodiment, an ESP assembly comprising an electric motor coupled to a pump, with the bearing bushing assembly of any one of the first to eighth embodiments being in the motor.

In a forty-sixth embodiment, an ESP assembly comprising an electric motor coupled to a pump, with the assembly of any one of the fourteenth to thirty-seventh embodiments being in the motor.

A forty-seventh embodiment can include placement of the ESP assembly of the forty-fifth or forty-sixth embodiment in a wellbore, and operation of same to pump formation fluids from the wellbore to the surface.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. An assembly for an ESP motor, comprising:
a cylindrical motor element of the ESP motor;
a spring-loaded anti-rotation tab biased radially away from a surface of the cylindrical motor element;
a retaining groove; and
a cylindrical retaining plate with an open bore, wherein the retaining plate is configured to fit within the retaining groove and to affix the anti-rotation tab to the cylindrical motor element, while allowing radial movement of the anti-rotation tab between an extended position and a retracted position;
wherein the retaining plate comprises a ring portion, spanning a full circumference, which is configured to have a constant diameter throughout installation onto the cylindrical motor element.

2. The assembly of claim 1, wherein the retaining plate comprises at least one tang extending radially from the ring portion of the retaining plate, wherein the tang comprises a gap extending from a tang distal end towards the ring portion.

3. The assembly of claim 2, further comprising at least one additional spring-loaded anti-rotation tab, substantially identical to the first anti-rotation tab, wherein the retaining groove is disposed on an exterior surface of the anti-rotation tabs, and wherein the anti-rotation tabs are disposed circumferentially on the surface of the cylindrical motor element.

4. A bearing bushing assembly for an electric submersible pump (ESP) motor, comprising:
a substantially cylindrical bearing bushing comprising:
a spring recess extending inward from an outer surface of the bearing bushing;
a tab axial slot in the outer surface of the bearing bushing, wherein the tab axial slot intersects the spring recess; and
a circumferential retaining groove in the outer surface of the bearing bushing, wherein the retaining groove intersects the tab axial slot;
an anti-rotation tab configured to fit and extend axially in the tab axial slot, the anti-rotation tab being radially slidable within the tab axial slot;
a biasing element configured to fit in the spring recess and to push radially outward on the anti-rotation tab in the tab axial slot; and
a cylindrical retaining plate with an open bore, wherein the retaining plate is configured to fit within the retaining groove and to retain the anti-rotation tab within the tab axial slot;
wherein the retaining plate comprises a solid ring portion, spanning a full circumference, which is configured to be disposed on the bearing bushing without changing a diameter of the ring portion.

5. The bearing bushing assembly of claim 4, wherein:
the bearing bushing comprises one or more passage axial slot in the outer surface of the bearing bushing which is circumferentially offset from but substantially parallel to the tab axial slot, wherein the passage axial slot is wider than the tab axial slot, the retaining groove intersects the passage axial slot, and the passage axial slot is deeper than the retaining groove; and
the retaining plate comprises at least one tang extending radially inward from the ring portion, wherein the tang comprises a gap extending from a tang distal end towards the ring portion, and the tang is configured to slidably fit within the passage axial slot.

6. The bearing bushing assembly of claim 5, wherein the tang is wider than the tab axial slot and extends radially inward sufficiently in the retaining groove so that, when the tang is not aligned with the passage axial slot, the retaining plate cannot move axially out of the retaining groove.

7. The bearing bushing assembly of claim 5, wherein the tang gap is aligned with the tab axial slot.

8. The bearing bushing assembly of claim 5, wherein the tang gap comprises a depth to interface with the anti-rotation tab to allow radial movement of the anti-rotation tab between an extended position and a retracted position.

9. The bearing bushing assembly of claim 5, wherein the tang comprises at least one angled side.

10. The bearing bushing assembly of claim 5, further comprising a second retaining plate and a corresponding second retaining groove, wherein:
- the second retaining plate has an open bore and is configured to fit within the second retaining groove;
- the second retaining plate comprises a ring portion, spanning a full circumference; and
- the second retaining plate further comprises at least one tang extending radially inward from the ring portion that is configured to slidably fit within the passage axial slot.

11. A bearing bushing assembly for an electric submersible pump (ESP) motor, comprising:
- a substantially cylindrical bearing bushing comprising:
  - a spring recess extending inward from an outer surface of the bearing bushing;
  - a tab axial slot in the outer surface of the bearing bushing, wherein the tab axial slot intersects the spring recess; and
  - a circumferential retaining groove in the outer surface of the bearing bushing, wherein the retaining groove intersects the tab axial slot;
- an anti-rotation tab configured to fit and extend axially in the tab axial slot, the anti-rotation tab being radially slidable within the tab axial slot;
- a biasing element configured to fit in the spring recess and to push radially outward on the anti-rotation tab in the tab axial slot; and
- a cylindrical retaining plate with an open bore, wherein the retaining plate is configured to fit within the retaining groove and to retain the anti-rotation tab within the tab axial slot;

wherein:
- the retaining plate comprises a ring portion, spanning a full circumference;
- the bearing bushing comprises one or more passage axial slot in the outer surface of the bearing bushing which is circumferentially offset from but substantially parallel to the tab axial slot, wherein the passage axial slot is wider than the tab axial slot, the retaining groove intersects the passage axial slot, and the passage axial slot is deeper than the retaining groove; and
- the retaining plate comprises at least one tang extending radially inward from the ring portion, wherein the tang comprises a gap extending from a tang distal end towards the ring portion, and the tang is configured to slidably fit within the passage axial slot.

12. The bearing bushing assembly of claim 11, wherein the tang is wider than the tab axial slot and extends radially inward sufficiently in the retaining groove so that, when the tang is not aligned with the passage axial slot, the retaining plate cannot move axially out of the retaining groove.

13. The bearing bushing assembly of claim 11, wherein the tang gap is aligned with the tab axial slot.

14. The bearing bushing assembly of claim 11, wherein the tang gap comprises a depth to interface with the anti-rotation tab to allow radial movement of the anti-rotation tab between an extended position and a retracted position.

15. The bearing bushing assembly of claim 11, wherein the tang comprises at least one angled side.

16. The bearing bushing assembly of claim 11, further comprising a second retaining plate, substantially identical to the first retaining plate, and a corresponding second retaining groove, substantially identical to the first retaining groove.

17. The bearing bushing assembly of claim 11, wherein the biasing element is integral with the anti-rotation tab.

18. An assembly for an ESP motor, comprising:
- a cylindrical motor element of the ESP motor;
- a spring-loaded anti-rotation tab biased radially away from a surface of the cylindrical motor element;
- a retaining groove; and
- a cylindrical retaining plate with an open bore, wherein the retaining plate is configured to fit within the retaining groove and to affix the anti-rotation tab to the cylindrical motor element, while allowing radial movement of the anti-rotation tab between an extended position and a retracted position;

wherein:
- the retaining plate comprises a solid ring portion, spanning a full circumference;
- the retaining groove is circumferentially disposed on the surface of the cylindrical motor element;
- the anti-rotation tab fits and extends axially in a tab axial slot disposed on the surface of the cylindrical motor element, wherein the tab axial slot intersects the retaining groove, and the anti-rotation tab is radially slidable within the tab axial slot between the extended position and the retracted position;
- the surface of the cylindrical motor element comprises a passage axial slot which is circumferentially offset from but substantially parallel to the tab axial slot, wherein the passage axial slot is wider than the tab axial slot, and the retaining groove intersects the passage axial slot; and
- the retaining plate comprises at least one tang extending radially from the ring portion of the retaining plate, wherein the tang comprises a gap, the tang is wider than the tab axial slot, the tang is configured to slidably fit within the passage axial slot, and the tang gap comprises a depth to interface with the anti-rotation tab to allow radial movement of the anti-rotation tab between the extended position and the retracted position.

19. The assembly of claim 18, wherein the tang gap is aligned with the tab axial slot, and the tang extends radially sufficiently into the retaining groove so that the retaining plate cannot move axially out of the retaining groove.

20. The assembly of claim 18, wherein the tang comprises at least one angled side.

* * * * *